US012737294B2

(12) United States Patent
Persson et al.

(10) Patent No.: US 12,737,294 B2
(45) Date of Patent: Sep. 15, 2026

(54) TECHNIQUE FOR STORING DATA IN A CACHE

(71) Applicant: Arm Limited, Cambridge (GB)

(72) Inventors: Håkan Lars-Göran Persson, Bjärred (SE); Fabio Pancot, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/417,340

(22) Filed: Jan. 19, 2024

(65) Prior Publication Data

US 2025/0238374 A1 Jul. 24, 2025

(51) Int. Cl.
*G06F 12/0811* (2016.01)
*G06F 12/0815* (2016.01)

(52) U.S. Cl.
CPC ...... *G06F 12/0811* (2013.01); *G06F 12/0815* (2013.01)

(58) Field of Classification Search
CPC ......................... G06F 12/0811; G06F 12/0815
See application file for complete search history.

(56) References Cited

U.S. PATENT DOCUMENTS 8,271,734 B1 * 9/2012 Glasco .................. G06F 12/084 345/546
2005/0228952 A1 * 10/2005 Mayhew ............. G06F 12/0817 711/E12.027
2006/0259828 A1 * 11/2006 Swoboda ................ G06F 21/62 714/38.1
2013/0238874 A1 * 9/2013 Avudaiyappan .... G06F 12/0802 711/207

(Continued)

FOREIGN PATENT DOCUMENTS

WO 2023139342 A1 7/2023

OTHER PUBLICATIONS

Ekman et al., “A Robust Main-Memory Compression Scheme”, Department of Computer Science and Engineering Chalmers University of Technology, Proceedings of the 32nd International Symposium on Computer Architecture (ISCA’05) , 2005, 12 pages.

*Primary Examiner* — Nicholas A. Paperno
(74) *Attorney, Agent, or Firm* — NIXON & VANDERHYE P.C.

(57) ABSTRACT

An apparatus is provided having cache circuitry providing a plurality of cache lines to store data for access by a processing element, and cache control circuitry to control storage of data in the cache circuitry. The cache control circuitry is arranged to manage storage of data within the cache circuitry for data blocks of size X exceeding a size of data that is storeable within a single cache line of the cache circuitry. The cache control circuitry is arranged, for each data block to be stored in the cache circuitry, to determine in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry. The cache control circuitry is further arranged to maintain a plurality of metadata entries in memory, where each metadata entry is associated with a data block of size X and is arranged to identify in which state that data block is represented when stored in the cache circuitry.

20 Claims, 10 Drawing Sheets

(56) References Cited

U.S. PATENT DOCUMENTS

| | | | | |
|---|---|---|---|---|
| 2019/0095331 | A1* | 3/2019 | Diamand | G06F 12/121 |
| 2023/0236979 | A1* | 7/2023 | Geng | G06F 12/084 |
| | | | | 711/118 |

* cited by examiner

TECHNIQUE FOR STORING DATA IN A CACHE

BACKGROUND

The present technique relates to the handling of data within a data processing system that includes one or more levels of cache, and in particular to techniques for efficiently storing data in a cache.

In modern data processing systems, there is ever-increasing demand for performance and low power consumption, and in such systems the memory subsystem (which typically includes one or more levels of cache between the data consuming elements of the system and main memory) often plays a significant role in determining available bandwidth within the system. Many modern tasks are characterised by data intensive workloads, which place significant demands on the memory subsystem, and can cause the memory subsystem to become a bottleneck for bandwidth.

It would hence be desirable to seek to increase the bandwidth available within the memory subsystem, and lower power consumption of the memory subsystem.

SUMMARY

In accordance with a first example arrangement, there is provided an apparatus comprising: cache circuitry providing a plurality of cache lines to store data for access by a processing element; and cache control circuitry to control storage of data in the cache circuitry, wherein the cache control circuitry is arranged to manage storage of data within the cache circuitry for data blocks of size X exceeding a size of data that is storeable within a single cache line of the cache circuitry; wherein the cache control circuitry is arranged, for each data block to be stored in the cache circuitry, to determine in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry; and the cache control circuitry is arranged to maintain a plurality of metadata entries in memory, where each metadata entry is associated with a data block of size X and is arranged to identify in which state that data block is represented when stored in the cache circuitry.

In accordance with another example arrangement, there is provided a method of storing data in cache circuitry, comprising: providing the cache circuitry with a plurality of cache lines to store data for access by a processing element; and employing cache control circuitry to control storage of data within the cache circuitry for data blocks of size X exceeding a size of data that is storeable within a single cache line of the cache circuitry by: for each data block to be stored in the cache circuitry, determining in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry; and maintaining a plurality of metadata entries in memory, where each metadata entry is associated with a data block of size X and is arranged to identify in which state that data block is represented when stored in the cache circuitry.

In accordance with a further example arrangement, there is provided a system comprising: the apparatus in accordance with the first example arrangement, implemented in at least one packaged chip; at least one system component; and a board, wherein the at least one packaged chip and the at least one system component are assembled on the board. In a still further example arrangement, there is provided a chip-containing product comprising the system of the above example arrangement assembled on a further board with at least one other product component.

In a yet further example arrangement, there is provided a computer-readable medium to store computer-readable code for fabrication of an apparatus in accordance with the first example arrangement discussed above. The computer-readable medium may be a transitory computer-readable medium or a non-transitory computer-readable medium.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
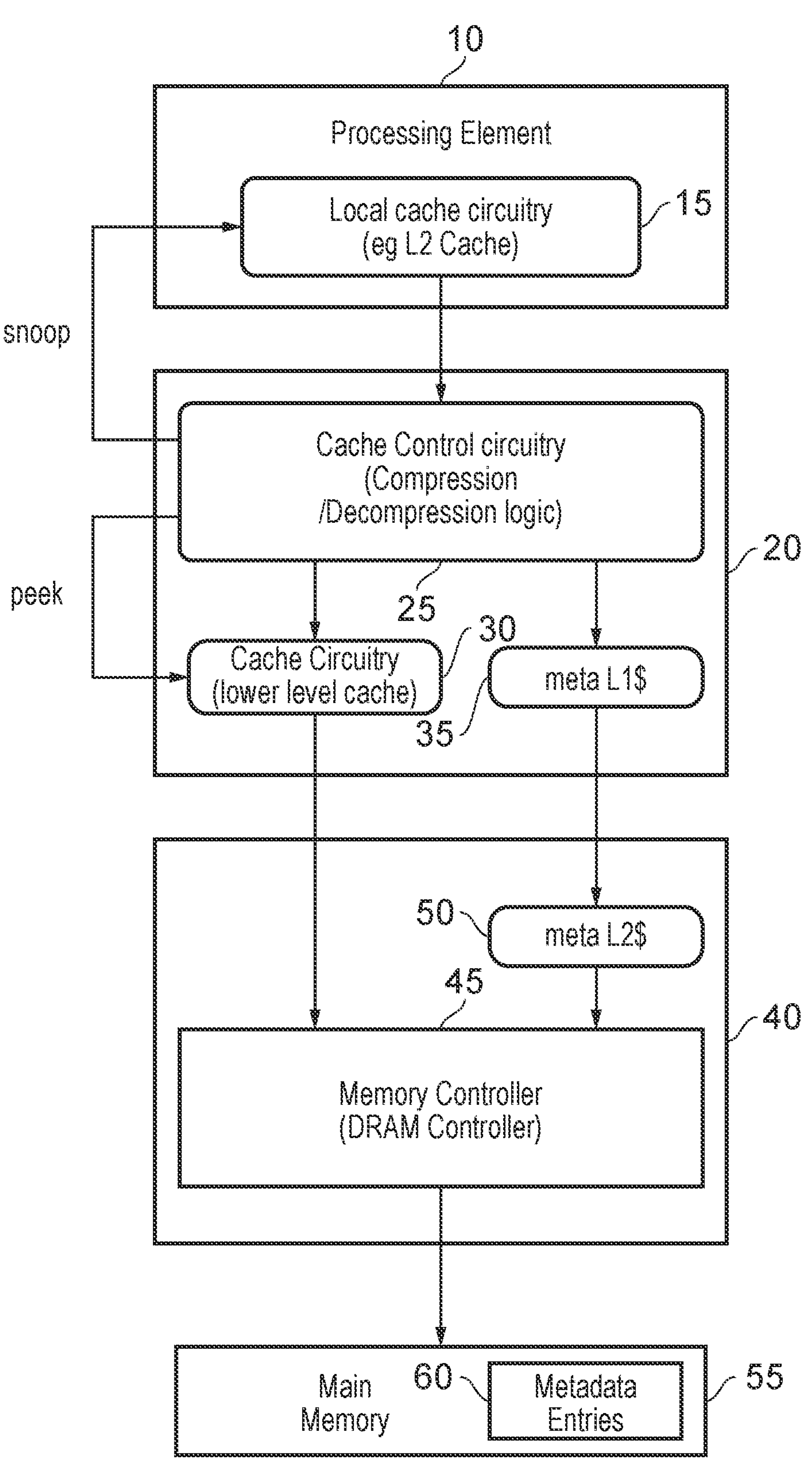
FIG. 1 is a block diagram of a data processing system in accordance with one example implementation.

In accordance with one example implementation, an apparatus has cache circuitry that provides a plurality of cache lines used to store data for access by a processing element, so as to reduce the time taken to access that data when compared with the processing element instead accessing that data in main memory. In a typical system, multiple levels of cache may be provided. As will be discussed in more detail below, in accordance with the techniques described herein a mechanism is provided to allow data in some instances to be stored in a compressed form within the cache circuitry, and this can be used to alleviate bandwidth constraints between the cache circuitry and main memory.

Whilst the above-mentioned cache circuitry may be provided at any suitable level within a multi-level cache hierarchy, in one example implementation the cache circuitry is positioned at a relatively low level within the multi-level cache hierarchy, with the volume of data traffic between the cache circuitry and main memory (including any intervening lower levels of caches between the cache circuitry and main memory) being dependent on the compression achieved within the cache circuitry. Any compressed data stored within the cache circuitry can then be decompressed before being provided to higher levels of cache within the multi-level cache hierarchy (i.e. levels of cache interposed between the above-mentioned cache circuitry and any processing element that can access the cache circuitry). In some example implementations, there may be multiple processing elements that can access the above-mentioned cache circuitry, and one or more of those processing elements may themselves have one or more local caches that may be used to cache data for access by those processing elements, such local caches being at a higher level in the cache hierarchy than the above-mentioned cache circuitry.

In accordance with the techniques described herein, cache control circuitry is provided to control storage of data in the above-mentioned cache circuitry. The cache control circuitry is arranged to manage storage of data within the cache circuitry for data blocks of size X exceeding the size of data that is storeable within a single cache line of the cache circuitry. For each data block to be stored in the cache circuitry, the cache control circuitry is arranged to determine in which state of a plurality of states to store that data block in the cache circuitry. The plurality of states comprise an uncompressed state where the data block is stored within a plurality Y of cache lines, and at least one compressed state where the data block is represented in a form occupying less than Y cache lines within the cache circuitry. In addition, the cache control circuitry is arranged to maintain a plurality of metadata entries in memory, where each metadata entry is associated with a data block of size X and is arranged to identify in which state that data block is represented when stored in the cache circuitry.

Hence, in accordance with the techniques described herein, the cache control circuitry considers data blocks of a size that would occupy multiple (Y) cache lines if the data block was stored in the cache circuitry in uncompressed form. However, the cache control circuitry has available multiple different states in which it can store a data block in the cache circuitry, and hence when considering any given data block it can seek to determine whether there is any available state that would allow that data to be stored in a more efficient form within the cache, i.e. a state where the data block can be represented within the cache in a form occupying less than Y cache lines. Metadata entries are then used to keep track of what state has been used for any given data block, so as to allow subsequent accesses to data within those data blocks to be processed appropriately. By such an approach, it is possible to reduce the data traffic between the cache circuitry and main memory, since when a compressed state is used for data of a particular data block, then less data needs to be passed to main memory on eviction of that data block from the cache circuitry, and less data needs to be loaded into the cache circuitry from main memory if in due course it is desired to restore that data within the cache. Indeed, as will be discussed in more detail later, in some instances one form of compressed state that may be provided can avoid the need for any data to be passed between the cache circuitry and main memory for any given data block that can be represented in that compressed state.

Whilst the data block size used may vary dependent on implementation, in one particular example implementation the data block is of a size that would require two cache lines for storage of the data of that data block within the cache circuitry in an uncompressed state, and herein when discussing such an example implementation the data block may be referred to as a cache line pair (CLP). Further, in such an example implementation, a number of compressed states may be supported, and for example one or more of those compressed states may only require data to be stored within one of the cache lines of the cache line pair. Further, as will be discussed in more detail later, in one example implementation it may in fact be possible for a given data block to be represented in a particular compressed state that does not require any data to be written into either cache line of the cache line pair and hence requires no data to be passed between the cache circuitry and main memory on eviction/reloading.

In one example implementation, the at least one compressed state comprises a data compression compressed state where the data forming a given data block is subjected to a compression algorithm to generate a compressed form of that data occupying a number of cache lines less than Y. Any suitable compression algorithm or compression algorithms may be used by the cache control circuitry to evaluate whether, for the data of the given data block, it is possible to compress that data into a compressed form that occupies less than Y cache lines. Where that is possible, then it will be appreciated that this allows a compressed form of data to be stored within the cache circuitry, and hence reduces the amount of data that needs to be passed between the cache circuitry and main memory on eviction/reloading. For example, in an implementation where the data block is a CLP, such a data compression compressed state may allow the data associated with a pair of cache lines to be stored in compressed form within only a single cache line, hence reducing by half the volume of data that needs to be passed between the cache circuitry and main memory for the data block in question.

In addition, or as an alternative, to the above compressed state, the at least one compressed state may comprise a zero detected state where the data in a given data block associated with at least one cache line is determined to be all zero, the all zero data is not stored in the cache circuitry and the metadata entry associated with the given data block is arranged to identify the data within the given data block that is all zero. There are various ways in which the data that is all zero can be identified by the metadata, but in one example this is done by identifying each cache line that would have had all zero data written to it if not using the zero detected state to represent the data.

In one example implementation there may be only a single form of zero detected state supported. For example, that single form of zero detected state may be used when all of the data in the data block is zero. In that case, it will be appreciated that for the given data block no data is written into the associated cache lines of the cache circuitry, and instead the associated metadata entry merely identifies that all of the data is zero. When using such a state, it will be appreciated that no data for the data block then needs to be passed between the cache circuitry and main memory on eviction/reloading, hence significantly reducing bandwidth constraints.

However, in an alternative implementation a number of different forms of the zero detected state may be supported. For example, this could allow for situations where some of the data in the data block is zero whilst the rest is not. By way of particular example, an additional zero detected state may allow for situations where the data of the data block that would occupy a first cache line is all zero, whilst the data of the data block that would occupy a second cache line is not. As another example, an additional zero detected state may allow for situations where the data of the data block that would occupy a first cache line is not zero, but the data of the data block that would occupy a second cache line is all zero. In either case, the non-zero data can be stored in the relevant cache line, and the associated metadata entry can be used to identify that the data for the other cache line is all zero. In some instances, it can be beneficial to support these additional variations of the zero detected state, as it can enable an effective compression of the data block without actually storing any data of the data block in a compressed form. As a result, if any of the data in the data block is later updated by a write operation, it will be possible to produce the updated data block without needing to decompress any data first, hence avoiding the need for a read/modify/write procedure that might otherwise be required had the data been stored in a data compression compressed state.

As will be apparent from the above discussion, when using a zero detected state that allows some of the data in the data block to be non-zero, any non-zero data within the given data block can be stored in uncompressed form within a number of cache lines less than Y, and the metadata entry associated with the given data block can be arranged to identify each cache line that stores the non-zero data. In one example implementation, this can be done by identifying the particular form of zero detected state used, which will by inference identify which cache line or cache lines store non-zero data.

In one example implementation, the cache control circuitry is responsive to a write transaction issued by the processing element providing a memory address indication for an item of data to be written into the cache circuitry, to determine with reference to the memory address indication an associated data block, and to determine an updated version of the associated data block produced by writing the item of data to the associated data block. In addition, the cache control circuitry is arranged to store the updated version of the associated data block in a given state chosen in dependence on the data forming the updated version of the associated data block, and to update the metadata entry provided for the associated data block as required to identify the given state. Hence, when processing such a write transaction, the cache control circuitry may determine that the state of the associated data block should be altered. For example, having regard to the item of data to be written, it may be possible that the updated data block can be represented in a more efficient form than was previously the case, or conversely it may be the case that the updated data block can no longer be represented in as efficient a form as used previously. In either case, the most appropriate state to use having regard to the updated data block can be selected by the cache control circuitry, with the updated data block then being represented within the cache circuitry in the chosen state, and with the associated metadata entry being updated as necessary to record the chosen state used for the updated data block.

In one example implementation, the processing element may have local cache circuitry. Such local cache circuitry can be viewed as cache circuitry at a higher level in the cache hierarchy than the earlier-mentioned cache circuitry to which the above described compression techniques are applied. When the item of data specified by the write transaction is less than size X, it will be appropriate for the cache control circuitry to obtain the remaining data of the associated data block so that it can then determine an updated version of the associated data block and the appropriate state to use to represent that updated version within the cache circuitry. In one example implementation, the cache control circuitry is arranged to issue a snoop request to seek to obtain the remaining data of the associated data block from the local cache circuitry if available, so as to enable the updated version of the associated data block to be produced.

Whilst in one example implementation there may be only a single processing element that has access to the earlier-mentioned cache circuitry to which the above described compression techniques are applied, in an alternative implementation there may be multiple such processing elements that can access the cache circuitry, and any number of those may have local cache structures. In such a situation, the snoop request can be issued to any of the processing elements that may locally have cached the required data. In some example implementations, a snoop filtering mechanism may be employed to seek to keep track of which local caches may have a copy of data for any given memory address, and when using such a snoop filtering mechanism the snoop request can be targeted at the one or more processing elements whose local caches are identified as potentially having a copy of the data in question.

As mentioned earlier, when the item of data specified by the write transaction is less than size X, it will be appropriate for the cache control circuitry to obtain the remaining data of the associated data block so that it can then determine an updated version of the associated data block and the appropriate state to use to represent that updated version within the cache circuitry. As another example of how the cache control circuitry may seek to obtain that data, then in one example implementation the cache control circuitry may be arranged, at least in the presence of a qualifying condition, to perform a lookup in the cache circuitry to seek to obtain remaining data of the associated data block from the cache circuitry if available, so as to enable the updated version of the associated data block to be produced. In one particular example implementation, such a lookup may be referred to as a "peek" so as to distinguish it from a lookup that may be performed during a normal read operation to seek to read the data. In particular, it is often the case that use information indicating how the data is used is kept for each cache line, for reference when deciding on candidate cache lines for eviction. For example a record of when any given cache line was last accessed may be kept, so that when selecting a cache line for eviction a least recently used cache line from amongst a number of possible cache lines for eviction may be chosen. It may be desirable that, when performing a peek for the purposes identified above, such use information is not updated and hence such peek lookups can be treated differently to normal lookups for that purpose.

The above-mentioned qualifying condition can take a variety of forms. For instance, in one example implementation both the above-mentioned snoop functionality with regard to higher-level caches, and peek functionality with regard to the cache circuitry, may be utilised, but it may be decided only to perform the above-mentioned peek in the cache circuitry if the remaining data of the associated data block is not identified as a result of performing the earlier-mentioned snoop in a higher level cache. Furthermore, irrespective of whether the peek functionality is used independently, or only when the above-mentioned snoop functionality has failed to identify the remaining data, the qualifying condition can also take into account other factors.

For example, in one example implementation, the cache control circuitry may be arranged to access the metadata entry for the associated data block, and to determine that the qualifying condition is present when the metadata entry identifies the associated data block as being in the uncompressed state. In particular, if the metadata entry identifies the associated data block as being in the uncompressed state, it is known that the remaining data of the associated data block will be available in an immediately usable form if it does already reside within the cache circuitry.

In one example implementation, if both the above mentioned snoop mechanism and peek mechanism are provided, but the remaining data of the associated data block is not available from either the local cache circuitry or the cache circuitry, the cache control circuitry may be arranged to determine how to process the write transaction in dependence on the state of the associated data block as indicated by the metadata entry for the associated data block. For example, if the metadata entry indicates that the associated data block is stored in uncompressed form, then it will be possible just to write the new item of data in uncompressed form without needing to change the state of the associated data block. As another example, if the metadata entry indicates that the associated data block is all zeros, then it is possible to construct the updated version of the data block without needing to retrieve the previous data (for example by merging the new write data with zeros for the remaining cache line or cache lines not covered by the new write data), and thereafter it can be decided on the most appropriate state to store the updated data block in. As another example, if the metadata entry indicates that the associated data block is stored in the data compression compressed state, then it would be necessary to retrieve the compressed form of the data from memory, decompress that data, and then merge in the new write data in order to produce the updated data block. Thereafter, it can be decided on the most appropriate state to store the updated data block in.

In one example implementation the plurality of states may include one or more swapped states in which a given portion of data of a size of a cache line is stored in a cache line other than a default cache line for that given portion of data, and the cache control circuitry is arranged to use a chosen swapped state from amongst the one or more swapped states when the associated data block was in a compressed state before the write transaction was processed, the updated version of the associated data block is to be stored in a compressed state (which could be a different compressed date to the previous compressed date used for the associated data block), and the use of the chosen swapped state will cause stale data to be overwritten. Such an approach can be useful, as it can avoid stale data being retained within the cache and hence avoid the need for a separate invalidation process to seek to invalidate that stale data.

Purely by way of explicit example, if we consider a data block in the form of a CLP it may be the case that at a certain point in time the data for that CLP is stored in the earlier-mentioned data compression compressed state, and it may be that the first cache line in the cache line pair is used to store the compressed data when the data compression compressed state is used. If in due course that compressed cache line pair is updated such that the first cache line is written with zeros, then the compressed data will be uncompressed, the non-zero uncompressed data for the second cache line can be written back to the second cache line of the cache, and the state for the cache line pair can be updated to reflect the new state. If one of the compressed states allows the first cache line to be all zeros, and the second cache line to be uncompressed, then that state could be used at this point, but since the zero data is not written into the first cache line, it will be appreciated that at this point the first cache line still stores the compressed data (which is now old and out of date) and the second cache line stores the non-zero uncompressed data associated with the second half of the CLP. As an alternative to having to separately invalidate the first cache line contents, if a swapped state is provided that allows for the first cache line to be zero, but for the second cache line's data to be stored in the first cache line of the cache line pair, then that swapped state can be used and the out of date stale (compressed) data will automatically be overwritten by the uncompressed data associated with the second cache line (which in accordance with the swapped state is actually stored in the first cache line).

If desired, another swapped state may be supported to allow situations where the data for each of the cache lines is stored in uncompressed form, but in the non-default cache line. For instance, consider the above CLP example where a swapped compressed state is being used where the first cache line is all zeros, and the data for the second cache line is non-zero and uncompressed, but is stored in the first cache line. If in due course the data associated with the first cache line is actually modified from being all zeros to being non-zero data, then if an uncompressed swapped state is supported, that could be used to allow the data for both cache lines to be stored in uncompressed form, but in swapped cache lines (in particular in this case the uncompressed data for the second cache line will continue to be stored in the first cache line, and the new uncompressed data for the first cache line will now be stored in the second cache line).

In some implementations, it can be beneficial to increase the number of possible states, for example by including the above-mentioned swapped states, so as to further increase the opportunities for reducing the bandwidth associated with transfer of data between the cache circuitry and main memory in either direction. However, that benefit needs to be balanced against the overhead introduced by the use of more metadata states and hence the increased metadata traffic needed to handle those various states.

In one example implementation, when the cache control circuitry causes the state associated with a given data block stored in the cache circuitry to be changed, the cache control circuitry may be arranged to cause invalidation of any cache lines in the cache storage that will store stale data as a result of the change of state. Such an approach can be used irrespective of whether the above described swapped states are provided or not, since even when the swapped states are supported there may still be situations where stale data may reside within the cache following an update to a given data block that causes the state in which that data block is represented within the cache circuitry to be changed.

By using such an invalidation process, this can free up space within the cache storage, and hence for example reduce the risk that other useful data might get evicted instead of the stale data. However, it should be noted that invalidation of stale data within the cache storage may not be required in order to ensure correct operation, as the cache control circuitry can be arranged to process any access request to the cache circuitry in dependence on the current state of the relevant data block as indicated in the associated metadata entry, thereby avoiding the risk of accessing stale data in the cache.

In situations where there are one or more intervening lower levels of cache between the above-mentioned cache circuitry and main memory, then any invalidation requests issued in respect of cache lines in the cache circuitry can also be propagated on to such lower levels of cache to ensure that the corresponding data is also invalidated from those caches to the extent that data is stored therein.

In one example implementation, the cache control circuitry is responsive to a read transaction issued by the processing element providing a memory address indication for an item of data to be read from the cache circuitry, to determine with reference to the memory address indication an associated data block, to access the metadata entry for that associated data block to determine the state in which the associated data block is stored, and to process the read request in dependence on the determined state for the associated data block. Hence, in accordance with such an approach, the cache control circuitry obtains from the relevant metadata entry the state of the associated data block, and can then determine how to provide the item of data specified by the read transaction. For example, if the metadata indicates that the data is all zero, then all zero data can be returned in response to the read transaction without needing to perform a lookup in the cache circuitry. As another example, if the metadata indicates that the data is uncompressed, then the uncompressed data can be obtained from the cache circuitry (assuming it is stored therein), or from a lower level cache or main memory in the event that a miss is detected in the cache circuitry. As another example, if the metadata indicates that the data is in the data compression compressed state, then the compressed data can be obtained from the cache circuitry (assuming it is stored therein), or from a lower level cache or main memory in the event that a miss is detected in the cache circuitry, the compressed data can then be decompressed, and the relevant portion of the decompressed data can be returned in response to the read transaction.

As will be apparent from the above discussion, the cache control circuitry will often need to access metadata entries for data blocks in order to decide how to process write and read transactions issued in respect of those data blocks. In order to improve performance, it can be useful to cache metadata entries so as to avoid the need to access main memory in order to read and/or update those metadata entries. Hence, in one example implementation the apparatus further comprises at least one metadata cache in which to cache metadata entries, each metadata cache providing cache lines in which to store a number of metadata entries, and a size of the cache lines in a given metadata cache being dependent on a location of the metadata cache within the apparatus.

It has been found that it can be beneficial for performance to determine the size of the cache lines for any given metadata cache taking into account where that metadata cache is placed within the apparatus. For instance, in one example implementation, the at least one metadata cache may be a memory controller level metadata cache associated with a memory controller used to issue memory transactions to memory of a given memory transaction size. In such an example, the size of the cache lines in the memory controller level metadata cache may be set in dependence on the given memory transaction size. For instance, the size of the cache line could be chosen to be a multiple or a fraction of the given memory transaction size, but in one particular example implementation the size of the cache line is chosen to be equal to the given memory transaction size. Such an approach can make more optimal use of the memory transaction bandwidth available to the memory controller. Indeed, the memory controller can then treat accesses to main memory to obtain metadata entries in the same way as other memory transactions, and will retrieve for storage in the memory controller level metadata cache a sequence of metadata entries occupying a block of memory of the given memory transaction size.

Further, by retrieving into the memory controller level metadata cache sequences of metadata entries, this may increase the chance of a hit been detected for subsequent requests for access to metadata entries. For example, once one metadata entry has been accessed, it may be likely that access to one or more other metadata entries stored within the cache line of the memory controller level metadata cache may also be needed relatively soon thereafter.

As one particular example of an implementation where such an increasing hit rate is likely to be observed, the cache circuitry may be arranged to be provided as one of a plurality of caches at a given level of a memory hierarchy, and data may be interleaved amongst the plurality of caches in dependence on an associated memory address of the data at an interleave granularity of N*X, where N is an integer of one or more. If those plurality of caches at the given level of the memory hierarchy are all organised in a similar way so as to allow selective compression of data stored therein, then it will be appreciated that the cache control circuits associated with each of those cache circuits will be making requests for access to a variety of metadata entries. Whilst the access requests from one cache control circuit may differ to the access requests from another cache control circuit, they may collectively issue access requests for metadata entries that all exist within a given cache line of the memory controller level metadata cache, and hence significant performance benefits can be achieved by arranging the size of the cache line of the memory controller level metadata cache as indicated above. In particular, once a cache line's worth of metadata entries has been retrieved into the memory controller level metadata cache in response to a request from one of the cache control circuits, it is likely that further access requests from other cache control circuits (and indeed one or more subsequent access requests from the same cache control circuit) may all hit within the retrieved cache line's worth of metadata entries. By providing the memory controller level metadata cache in association with the memory controller, all of those various cache control circuits can be arranged to access the memory controller level metadata cache and hence benefit from the increased hit rate achievable by arranging cache lines in the memory controller level metadata cache to be of a size corresponding to the memory transaction size.

Within an implementation of the form discussed above, where the cache circuitry is arranged to be provided as one of a plurality of caches at a given level of a memory hierarchy, and data is interleaved amongst the plurality of caches in dependence on an associated memory address of the data at an interleave granularity of N*X, where N is an integer of one or more, it can also be beneficial to provide another, higher, level of metadata cache that can be associated with each cache circuitry/associated cache control circuitry. In particular, in one example implementation, the at least one metadata cache may comprise a cache circuitry level metadata cache that is accessible to the cache control circuitry, wherein the size of the cache lines in the cache circuitry level metadata cache is set in dependence on the interleave granularity. In particular, the cache lines in the cache circuitry level metadata cache merely need to cache metadata entries that would store state relevant to the data that can be cached in the associated cache circuitry, and hence it is appropriate to arrange the size of each cache line taking into account the interleave granularity. When adopting such an approach, the cache lines in the cache circuitry level metadata cache merely need to be big enough to hold a number of metadata entries matching the number of data blocks within the interleave granularity. For example, if the interleave granularity is 2× it may be appropriate for each cache line in the cache circuitry level metadata cache to be sized sufficient to store two metadata entries, whilst if the interleave granularity is X it may be appropriate for each cache line in the cache line circuitry level metadata cache to be sized sufficient to store a single metadata entry. By providing such a cache circuitry level metadata cache, this can further reduce the time taken for the cache control circuitry to access required metadata entries, whilst avoiding such a cache circuitry level metadata cache storing any metadata entries that are not relevant to the associated cache circuitry in question (taking into account the data that could be stored within that cache circuitry).

The types of states provided within the plurality of states that the cache control circuitry can choose between, when deciding how to represent any given data block when stored in the cache circuitry, can be varied dependent on implementation. However, in one example implementation, the plurality of states are chosen so as to remove a need for a read-modify-write operation in at least one scenario when a data block stored in the cache circuitry is updated. In particular, the need to perform a read-modify-write operation can significantly impact performance, so it is desirable to reduce the number of scenarios where such a read-modify-write operation would be required. Purely by way of illustration as to how some of the states described herein can reduce the need for read-modify-write operations, the following examples are given. If a CLP is stored in uncompressed form and a single cache line in the CLP is written with a new item of data, then read-modify-write can be avoided and the new item of data can merely be written to the relevant cache line. As another example, assuming a compressed state is provided that allows one of the two cache lines to be zero, then if one cache line in the CLP is zero and the non-zero cache line is written, then the contents of the non-zero cache line can just be updated (as one of the cache lines is still zero, there is nothing to gain from considering jointly compressing the data of the two cache lines). As a yet further example, if one cache line in the CLP is zero, and the all zero cache line is written with non-zero data, then the CLP can readily be converted to uncompressed form, and the cache line that previously was determined to be all zero can then be updated to store the new item of data without needing to perform any read-modify-write process.

In some of the examples illustrated above, it is assumed that write transactions and read transactions can specify an item of data smaller than the data block size X. Hence, as discussed earlier snoop and/or peek mechanisms can be used to seek to obtain remaining data of the associated data block. However, in an alternative implementation, if the processing element has local cache circuitry, it may be arranged that the local cache circuitry provides a plurality of cache lines of size X. In such cases, then any write or read transactions can be constrained to identify data of size X, and hence there will be no need to support the use of snoop or peek mechanisms to seek to obtain any remaining data of a data block. However, supporting a larger cache line size in the local cache circuitry can result in an increase in the amount of data that is fetched from memory without being used, so the actual cache line size chosen for any local cache circuitry may be varied dependent on implementation.

Particular example implementations will now be described with reference to the figures. FIG. 1 is a block diagram of a data processing system in accordance with one example implementation. In the example shown in this figure, processing element 10 is arranged to perform data processing operations on data. The data processed will have associated memory addresses in main memory 55. Source data required for the data processing operations can be loaded from memory into internal registers of the processing element 10 prior to performing data processing operations on that data, and result data generated as a result of performing those data processing operations may be stored back to main memory from those registers.

To reduce access times to the data, a cache hierarchy consisting of one or more levels of cache may be interposed between the processing element 10 and main memory 55 to cache a subset of the data held in main memory. In the example shown in FIG. 1, the processing element has local cache circuitry 15 arranged to cache data for access by the processing element. There may be more than one level of cache provided locally to the processing element, and in the specific example shown the local cache circuitry 15 takes the form of a level 2 cache, and in addition to the level 2 cache there may be a level 1 cache (not shown) that is also local to the processing element 10. When the processing element issues an access request seeking to access data, a lookup may first be performed within the level 1 cache, with the data being accessed in the level 1 cache if it is present. However, in the event of a miss in the level 1 cache, the request can be propagated on to the level 2 cache (which would typically be larger than the level 1 cache), to allow a lookup to be performed in the level 2 cache. If the data is present in the level 2 cache, it can be accessed by the processing element in the level 2 cache, but in the event of a miss in the level 2 cache the access request can be propagated on to lower levels of cache and/or main memory 55.

In the example shown in FIG. 1, there is a lower level cache 30 (also referred to herein as cache circuitry) which is interposed between the level 2 cache 15 of the processing element 10 and main memory 55, and hence access requests propagated on from the level 2 cache 15 may result in a lookup within the lower level cache 30. As denoted by the box 20, a number of other components are provided in association with the lower level cache 30. In particular, compression/decompression logic 25 (also referred to herein as cache control circuitry) is provided for controlling the form in which data is stored within the lower level cache 30. In particular, a plurality of states are provided in which data blocks can be stored within the lower level cache. Each data block is of a size that is a multiple of the size of a single cache line within the lower level cache 30, and the cache control circuitry 25 is used to determine, for any given data block, how that data block should be represented when stored within the lower level cache 30. One of the supported states may be an uncompressed state where the data block is stored in uncompressed form within the multiple cache lines required to store such data. However, in addition, one or more compressed states may be provided where the data block is represented in a form that occupies less cache lines than would be required to store the data in uncompressed form.

By allowing data blocks to selectively be stored in a compressed state this can alleviate the bandwidth constraints between the lower level cache 30 and main memory 55 by reducing the volume of data traffic routed via the memory controller 45 (referred to in FIG. 1 as a DRAM controller since in this example the main memory is assumed to be implemented as dynamic random access memory) between the lower level cache 30 and main memory 55 in either direction. By way of specific example, in one example implementation the data block is of a size that is twice the size that can be stored in any single cache line of the lower level cache 30, and hence if a data block is stored in uncompressed form two cache lines will be used to store the data. If by way of specific example we consider the cache line size to be 64 bytes, then this means that the data block is of size 128 bytes, and hence when uncompressed data of a data block is moved between lower level cache 30 and main memory 55 in either direction, 128 bytes of data needs to be passed via the memory controller 45. If by way of example the memory controller deals with transactions of size 64 bytes, this means two memory transactions need to be performed in respect of main memory to move data of the data block between the lower level cache 30 and the main memory 55.

However, as will be discussed in more detail below, when a compressed state is used for a data block, the data will occupy less than the default number of cache lines, and hence in the above example where the data block is the size of two cache lines, this may in fact mean that the data for the data block can be stored within one cache line. Indeed, in a particular compressed state discussed herein where it is determined that all or at least one cache line's worth of the data in a data block has the value zero, it is possible not to explicitly store the data that is all zero at all, hence avoiding the need to propagate any of the all zero data between the lower level cache 30 and main memory 55. It has been found that such an approach can significantly reduce the bottleneck that can otherwise arise in association with memory accesses, hence enabling the performance of the data processing system to be improved.

To enable the data processing system to keep track of the state in which any given data block is to be represented when stored within the lower level cache 30, the cache control circuitry 25 can be arranged to maintain a plurality of metadata entries 60 in main memory 55, where each metadata entry is associated with a data block and is arranged to identify in which state that data block is represented when stored in the cache circuitry. To improve access times to the metadata entries, one or more levels of metadata cache may be provided to cache a subset of the metadata entries. In the example shown in FIG. 1, and as denoted by the box 40, there is a level of metadata cache 50 that may be provided in association with the memory controller 45, that level of metadata cache also being referred to herein as a memory controller level metadata cache, or a meta L2 cache. In addition, if desired, a higher level of metadata cache 35 may be provided in association with the lower level cache 30, that higher level of metadata cache also being referred to herein as a cache circuitry level metadata cache or a meta L1 cache.

When the cache control circuitry 25 needs to access an associated metadata entry for a given data block, it can issue a request to the meta L1 cache 35 to see if the associated metadata entry is present within the meta L1 cache 35, and if so can read that metadata entry from the meta L1 cache, and if necessary update that metadata entry in dependence on how the given data block is processed. In the event of a miss in the meta L1 cache 35, the request can be propagated on to the meta L2 cache 50 so that if the metadata entry is present it can be retrieved from the meta L2 cache 50 for reference by the cache control circuitry 25. At that point, if desired, that retrieved metadata entry may also be cached within the meta L1 cache 35 for future reference. In the event of a miss within the meta L2 cache 50, a request can be propagated on by the memory controller 45 to retrieve a plurality of metadata entries, including the associated metadata entry of interest, into the meta L2 cache 50.

The size of the cache lines in any given metadata cache can be arranged to be dependent on the location of that metadata cache within the apparatus. Hence, considering by way of example the meta L2 cache 50 that is provided in association with the memory controller, it can be efficient to arrange each cache line within the meta L2 cache to have a size that is dependent on the memory transaction size processed by the memory controller, in one particular example the cache line size being set equal to the memory transaction size. Hence, if the memory transaction size is 64 bytes, each cache line in the meta L2 cache 50 may be 64 bytes, and hence when metadata entries 60 are retrieved by the memory controller 45 into the meta L2 cache 50, 64 bytes worth of metadata entries may be retrieved at a time. The number of bits required for each metadata entry will depend on the number of different states supported, but as will be discussed in more detail later in some example implementations may be either 2 bits or 4 bits. Hence, this means that between 128 and 256 metadata entries can be stored in each cache line. In a specific example where each metadata entry is associated with a 128 byte data block this means that each cache line can effectively provide the metadata information for a 16 KB or 32 KB range of physical memory depending on whether 2 bits or 4 bits are required for each metadata entry.

In contrast, the size of the cache lines within the meta L1 cache 35 can be set in dependence on other factors. For example, as will be discussed in more detail later with reference to FIG. 8, the lower level cache 30 may be provided as one of a plurality of caches that collectively form the associated level of the cache hierarchy, and data may be interleaved amongst those caches in dependence on an associated memory address of the data at a chosen interleave granularity. In one example implementation, if a data block is of size X, the interleave granularity will be N*X, where N is an integer of one or more. Hence, if the data block is 128 bytes, the interleave granularity can be chosen to be either 128 bytes, 256 bytes, etc. It is often the case that it is useful to keep the interleave granularity relatively small, as this can enable better load balancing to be achieved across the multiple instances of the lower level cache. In one example implementation, the size of each cache line in the meta L1 cache 35 is set in dependence on the interleave granularity. In one particular example the size of cache line is set equal to the interleave granularity, and accordingly if the interleave granularity is 128 bytes, and the data blocks considered by the cache control circuitry 28 are also 128 bytes, then each cache line in the meta L1 cache 35 will be arranged to store a single metadata entry, and hence in the above discussed examples may be either 2 bits or 4 bits long, dependent on the number of states supported for storing data within the lower level cache 30.

Whilst the cache line size in the meta L1 cache is relatively small, there can be significant benefits in providing the meta L2 cache 50 with relatively large cache lines. In addition to making the interface with the memory controller 45 simpler (by adopting a transaction size that matches the transaction size for normal data accesses to memory), there is also likely to be significant data locality in the series of accesses performed by the processing element 10. Whilst those accesses may spread over memory addresses that require interleaving/striping those accesses across multiple instances of the lower level cache 30, hence requiring different metadata entries to be populated within the associated meta L1 cache 35 of each lower level cache instance 30, multiple of those accesses are likely to hit within the same cache line of the meta L2 cache 50, and hence once a cache line has been populated within the meta L2 cache 50, it is likely that a series of hits will then be detected within the meta L2 cache, due to a series of requests coming from multiple instances of meta L1 caches 35.

Whilst in FIG. 1 no further caches are shown between the lower level cache 30 and main memory 55, in one example implementation there may one or more further levels of cache between the lower level cache 30 and main memory 55 and data cached in any of those intervening caches will be stored in the same form as the data is stored within the lower level cache 30, and hence in a form that has been selected by the cache control circuitry 25.

Figure 2:
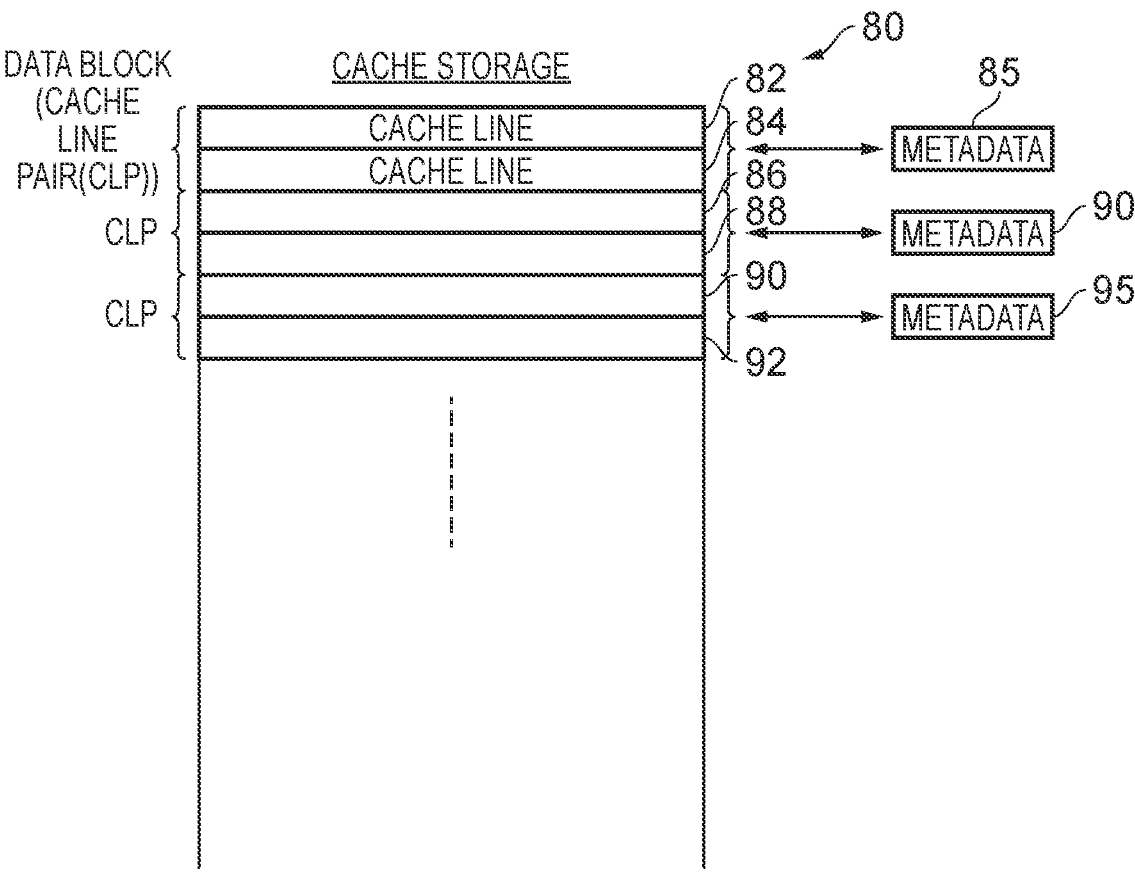
FIG. 2 schematically illustrates how the data stored in multiple cache lines may be grouped into data blocks, with associated metadata being maintained to identify in which of a number of possible states each data block is represented when stored within the cache storage, in accordance with one example implementation.

FIG. 2 illustrates cache storage 80 that may be provided within the lower level cache 30 of FIG. 1, in accordance with one example implementation. The cache storage provides a plurality of cache lines 82, 84, 86, 88, 90, 92, and the cache control circuitry 25 is arranged to handle the storage of data in data blocks that are of a size that is a multiple of the cache line size. In the particular example shown in FIG. 2, each data block is of a size that is twice the cache line size, and hence may also be referred to herein as a cache line pair (CLP). For each CLP, metadata 85, 90, 95 is stored within metadata entries 60 within the main memory 55, and a subset of the metadata entries may be cached within the metadata caches 35, 50 discussed earlier with reference to FIG. 1. Each metadata entry has its contents set by the cache control circuitry 25 to identify in which state the associated data block is represented when stored in the cache 30.

The cache storage 80 can be arranged in a variety of ways. For example, it could be arranged as a fully associative cache where any given item of data can be stored in any of the cache lines, and hence the address associated with that given item of data does not constrain in which cache line it is stored (in the striped implementation discussed above the associated address may determine which cache instance stores any given item of data, but when using a fully associative structure an item of data to be stored in a given instance of the lower level cache may then be stored in any available cache line). In such an implementation, any two cache lines can be grouped together to form a CLP, and used to store the data associated with a memory aligned data block (so taking the example of 128 byte sized data blocks, each of the data blocks will have associated 128 byte aligned memory addresses). As another example, the cache storage 80 could be arranged as a set associative cache, where an index portion of a memory address is used to identify a set within the cache, that set comprising a cache line in each of the ways of the cache. A data item whose index portion of its associated memory address identifies a given set is then able to be stored within any of the cache lines of that given set. In such a set associative example, the two cache lines of a CLP will typically be in adjacent sets but not necessarily within the same way.

Figure 3:
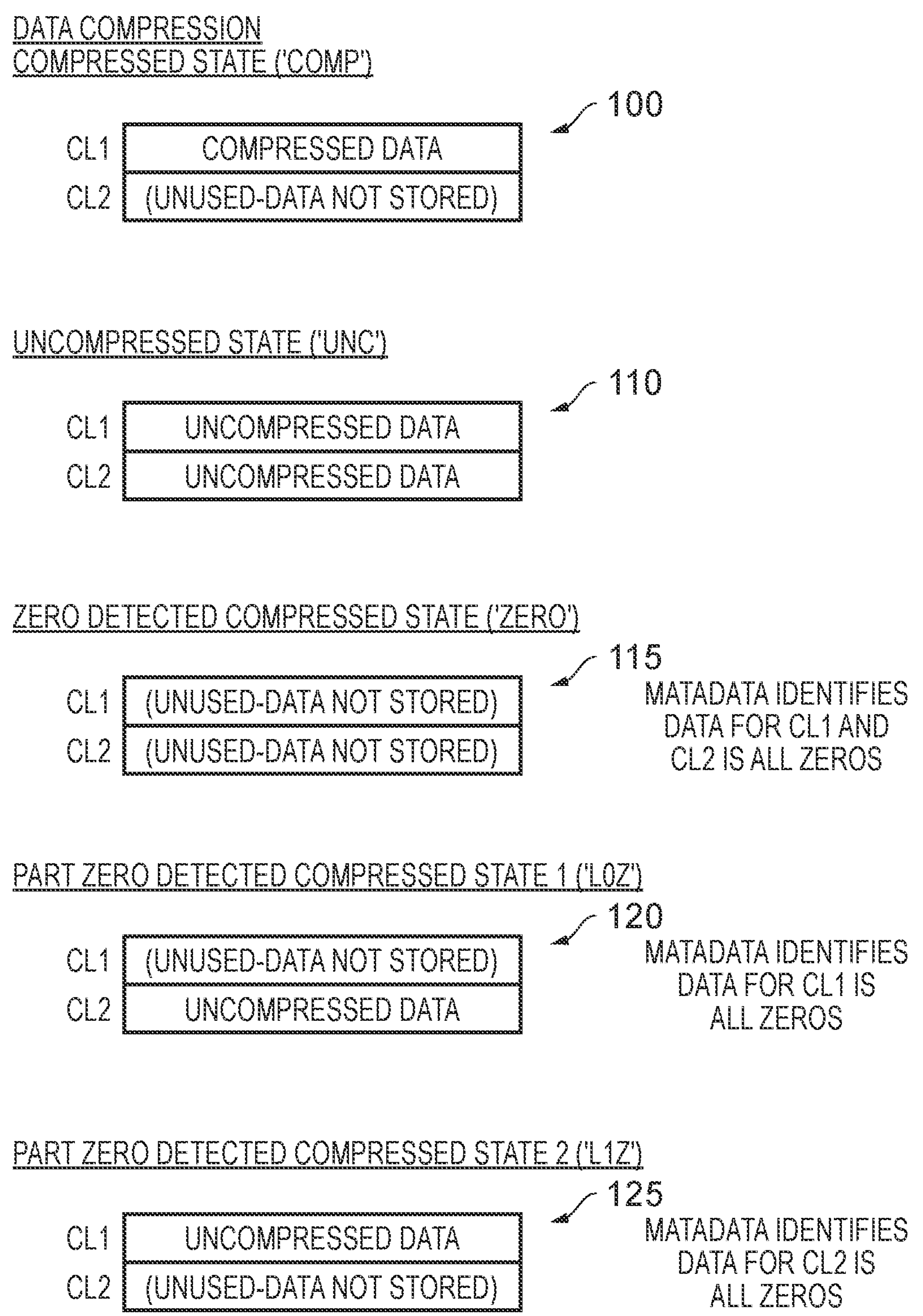
FIG. 3 schematically illustrates a number of possible states that may be used when storing a data block in the cache circuitry, in accordance with one example implementation.

As noted earlier, the number of supported states from which the cache control circuitry 25 can choose how to represent any given data block when stored within the lower level cache 30 may vary dependent on implementation. FIG. 3 illustrates examples of some of the states which may be provided in some implementations, in the example shown a data block being a CLP and hence providing data that would require two cache lines within the cache to store that data in uncompressed form. State 100 is an example of a data compression compressed state, also referred to herein as the "COMP" state. In accordance with this example, the data that would occupy both cache lines of a CLP is subjected to a data compression operation in order to produce compressed data that can be stored within a single cache line. In the example shown in FIG. 3, the compressed data is then stored within the first cache line of the CLP, and the second cache line of the CLP is unused, i.e. no data is stored in the second cache line to represent the data of the CLP. Any suitable compression technique can be used by the cache control circuitry 25 in order to evaluate, for the data of any given data block, whether it is possible to represent that data in compressed form occupying a single cache line.

State 110 is an uncompressed state, also referred to herein as the "UNC" state. In accordance with this example, the data is left in uncompressed form, and hence occupies both cache lines of the CLP. State 115 is a zero detected compressed state, also referred to herein as a "ZERO" state. This state can be used when it is determined that all of the data in the CLP is zero. In this case, both cache lines of the CLP are not used to store data, and instead the associated metadata entry identifies that the zero detected compressed state has been used, and that hence the data for both first and second cache lines of the CLP is all zero.

In one example implementation, the states 100, 110, 115 may be the only states supported, and in that case it will be appreciated that a two bit metadata entry is all that is required to enable the different states to be identified within any given metadata entry. However, in an alternative implementation a couple of further states 120, 125 may be provided. The state 120 is referred to in FIG. 3 as part zero detected compressed state 1, also referred to herein as state "L0Z", and may be used when it is determined that all of the data in the first cache line of the CLP is zero, but that the data in the second cache line of the CLP is non-zero. In that instance, the uncompressed data for the second cache line can be stored within the second cache line, and the first cache line may be unused, in that no data is stored in that cache line. The associated metadata entry can then be used to identify that the L0Z state has been used, and that hence the data for the first cache line is all zero.

Similarly, state 125 is referred to in FIG. 3 as part zero detected compressed state 2, also referred to herein as state "L1Z", and may be used when it is determined that all of the data in the second cache line of the CLP is zero, but that the data in the first cache line of the CLP is non-zero. In that instance, the uncompressed data for the first cache line can be stored within the first cache line, and the second cache line may be unused, in that no data is stored in that cache line. The associated metadata entry can then be used to identify that the L1Z state has been used, and that hence the data for the second cache line is all zero.

Whilst accommodating the additional L0Z and L1Z states means that 2 bits is insufficient to distinguish between the five available states, and hence in one example implementation each metadata entry will be specified by 4 bits, there can be a number of benefits arising from the provision of these additional states. In particular, the provision of the additional two states increases the scenarios where data can be stored within a compressed form, hence reducing the volume of traffic that needs passing between the lower level cache 30 and main memory 55. Further, the use of the L0Z and L1Z states can increase the number of scenarios where a read-modify-write operation can be avoided when the data in a data block is updated. For example, if the data in one cache line of the CLP is all zero (allowing the L0Z or L1Z state to be used) and the non-zero cache line is written to with updated data, then the contents of the non-zero cache line can just be updated (as one of the cache lines is still zero, there is nothing to gain from considering jointly compressing the data of the two cache lines). The state does not need to be changed as a result of this update, and accordingly the existing L0Z or L1Z state can be retained. As another example, if the data in one cache line of the CLP is zero, and the all zero cache line is written with non-zero data, then the CLP can readily be converted to uncompressed form (by changing the state from the L0Z or L1Z state to the UNC state), and the cache line that previously was determined to be all zero can then be updated to store the new item of data without needing to perform any read-modify-write process.

In a further example implementation, a number of swapped states may also be supported, in which a given portion of data of the size of a cache line is stored in a cache line other than the default cache line for that given portion of data. The cache control circuitry 25 may be arranged to use a chosen swapped state from amongst the one or more swapped states when a target data block was in a compressed state before a write transaction was processed, the updated version of that data block is also to be stored in a compressed state (which could be a different compressed state to the previous compressed state used for the data block), and the use of the chosen swapped state will cause stale data to be overwritten.

Purely by way of explicit example, if we consider a data block in the form of a CLP it may be the case that at a certain point in time the data for that CLP is stored in the earlier-mentioned COMP state, and as per the example of FIG. 3 the first cache line in the cache line pair is used to store the compressed data. If in due course that compressed cache line pair is updated such that the first cache line is written with zeros, then the compressed data will be uncompressed, the non-zero uncompressed data for the second cache line can be written back to the second cache line of the cache, and the state for the cache line pair can be updated to reflect the new state L0Z. However, since the zero data is not written into the first cache line, it will be appreciated that at this point the first cache line still stores the compressed data (which is now old and out of date) and the second cache line stores the non-zero uncompressed data associated with the second half of the CLP. As an alternative to having to separately invalidate the first cache line contents, a swapped state L0Z_S may be provided that allows for the first cache line to be zero, but for the second cache line's data to be stored in the first cache line of the cache line pair, which causes the out of date stale (compressed) data to automatically be overwritten by the uncompressed data associated with the second cache line (which in accordance with this swapped state is actually stored in the first cache line).

In one particular example implementation the following four swapped states are provided:

- UNC_S: UNC state, but data is stored at swapped addresses
- L0Z_S: data for first cache line is 0, data for second cache line is stored in first cache line
- L1Z_S: data for second cache line is 0, data for first cache line is stored in second cache line
- COMP_S: COMP state, but the compressed data is stored in the second cache line It will be appreciated that each of the L0Z_S, L1Z_S and COMP_S states can be used to cause out of date stale data to be overwritten when the data of the data block is updated (in particular where the data of the data block is stored in a compressed form before the update, and is also stored in a compressed form after the update). In addition, the UNC_S state can also be provided to allow situations where the data for each of the cache lines is stored in uncompressed form, but in the non-default cache line. For instance, consider a CLP where the L0Z_S state is being used (since the first cache line is all zeros, and the data for the second cache line is non-zero and uncompressed, but is stored in the first cache line). If in due course the data associated with the first cache line is actually modified from being all zeros to being non-zero data, then if the UNC_S swapped state is supported, that can be used to allow the data for both cache lines to be stored in uncompressed form, but in swapped cache lines (in particular in this case the uncompressed data for the second cache line will continue to be stored in the first cache line, and the new uncompressed data for the first cache line will now be stored in the second cache line).

In some implementations, it can be beneficial to increase the number of possible states, for example by including the above-mentioned swapped states, so as to further increase the opportunities for reducing the bandwidth associated with transfer of data between the cache circuitry and main memory in either direction.

Figure 4:
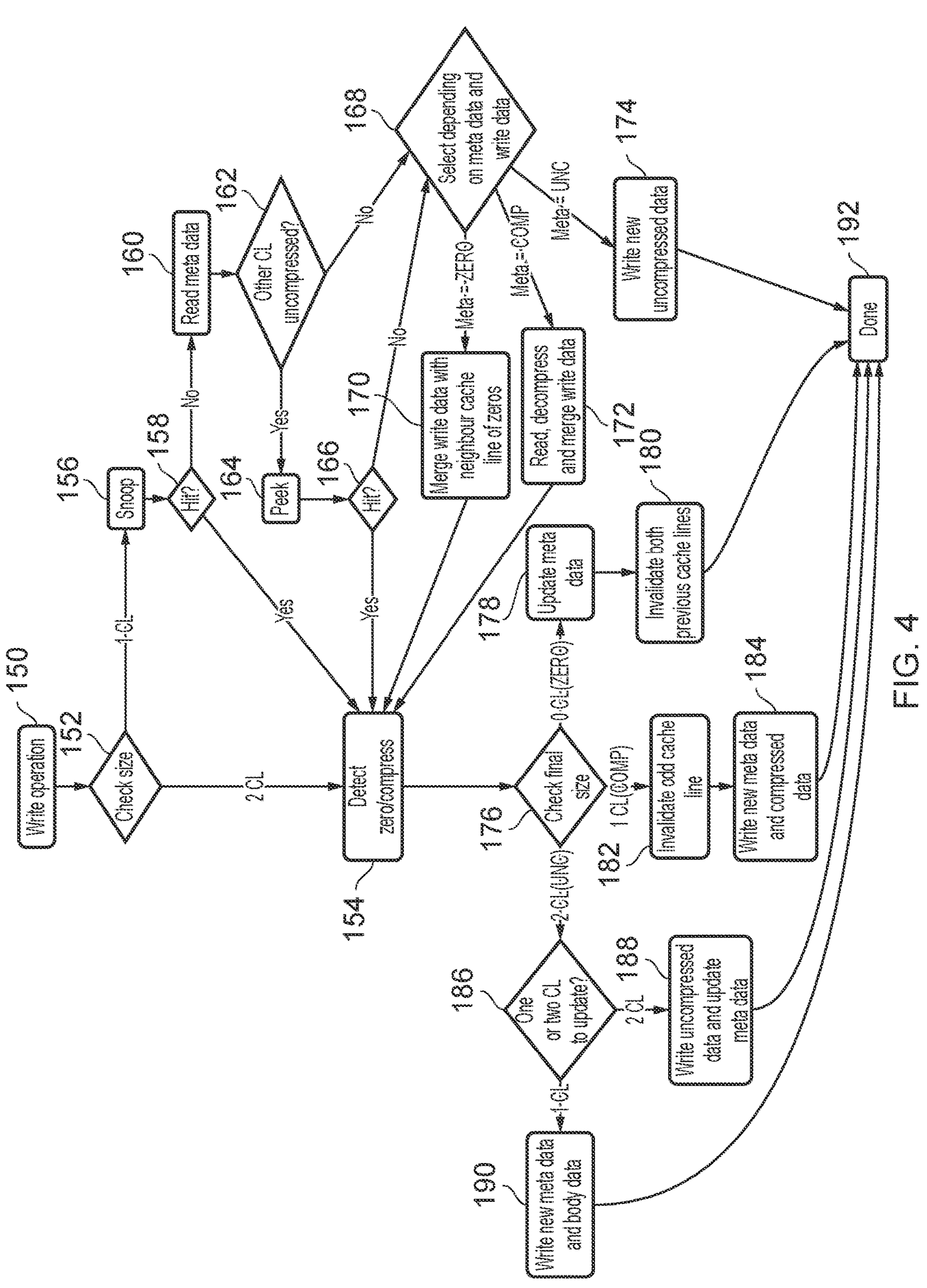
FIG. 4 is a flow diagram illustrating the handling of a write operation, in accordance with one example implementation.

FIG. 4 is a flow diagram illustrating the handling of a write operation by the cache control circuitry 25, in accordance with one example implementation. In this example, it is assumed that three possible states are supported, namely the COMP state 100, the UNC state 110 and the ZERO state 115. At step 150, a write operation (also referred to herein as a write transaction) issued by the processing element 10/level 2 cache 15 is detected by the cache control circuitry 25, whereafter at step 152 the size of that write operation is detected. In particular, assuming each data block is a CLP it can be determined here whether the write transaction relates to the data of a single cache line, or to the data of both cache lines, of a CLP. Purely by way of specific example, in one example implementation each cache line may be 64 bytes, and the write transaction may identify 64 bytes of data or 128 bytes of data. If the write transaction specifies 128 bytes of data, then it is known that all of the data of the CLP is provided by the write transaction, and hence the process can proceed directly to step 154 where the cache control circuitry 25 detects whether any of the compressed states (in this case the COMP state or the ZERO state) can be used to represent the updated data of the CLP in question.

However, if the size of the write transaction is 64 bytes, then the cache control circuitry 25 needs to obtain the remaining 64 bytes of the CLP in order to determine the updated version of the CLP, and then determine whether any of the compressed states can be used to represent that updated version of the CLP. Accordingly, in that instance, the process proceeds to step 156, where a snoop request may be issued from the cache control circuitry 25 to the L2 cache 15 to seek to retrieve the remaining data of the CLP. As will be discussed in more detail later with reference to FIG. 8, if there are multiple processing elements that may use the lower level cache 30, and that have their own local caches, then the snoop request may be issued to each of those local caches (if a snoop filtering mechanism is used to keep track of which caches may store copies of data for any given memory address, then the snoop filtering mechanism can be used to target the snoop request to those local caches that may have a copy of the data required).

At step 158, it is determined whether a hit has been detected as a result of performing the snoop request. If so, then the remaining data for the CLP will have been obtained, and the process can proceed to step 154. However, if a miss is detected as a result of performing the snoop request, then the process proceeds to step 160, where the associated metadata for the CLP in question is retrieved (as discussed earlier the cache control circuitry 25 can seek to access the metadata entry containing the associated metadata in the meta L1 cache 35, in the meta L2 cache 50 in the event that the metadata entry is not provided in the meta L1 cache, or from main memory 55 if the metadata entry is not contained in either of those caches).

Once the relevant metadata entry has been accessed, the cache control circuitry 25 can determine at step 162 whether the other cache line is in an uncompressed form, and if so a peek operation can be performed at step 164 in order to seek to retrieve the uncompressed data from the lower level cache 30 if that data is in fact cached in that lower level cache. It is then determined at step 166 whether a hit has been detected in the lower level cache 30, and if so the process can proceed to step 154, since all of the data required to form the updated version of the CLP will now be available.

If it is determined at step 162 that the other cache line is not in uncompressed form, or a hit is not detected at step 166, then the process proceeds to step 168 where one of a number of options is chosen in dependence on the metadata and the write data. For example, if the metadata indicates that the previous version of the data was all zeros, then at step 170 the new write data can be merged with the neighbouring cache line of all zeros and then the process can proceed to step 154. If instead the metadata indicates that the previous version of the CLP was stored in the COMP state, then the previous version of the CLP can be read (from the lower level cache 30 if cached, or otherwise from main memory 55), that data can be decompressed, and then the new write data can be merged with the decompressed data to form the updated version of the CLP, whereafter the process can proceed to step 154. If instead the metadata indicates that the previous version of the CLP was stored in the UNC state then there will be no need to obtain the previous version of the CLP, and instead the new data can be written in uncompressed form at step 174 (when discussing with reference to FIG. 4 the writing of updated data, it will be assumed that the writing is taking place to the relevant cache line or cache lines of the lower level cache 30, but it will be appreciated that in some instances the write operation may actually be performed in main memory 55 if the lower level cache is not currently being used to cache data of the data block in question, and it is decided not to allocate the data into the lower level cache at this point in time). No update to the metadata state is required, as the CLP will still be stored in uncompressed form, and accordingly at that point the process can end at step 192.

Returning to step 154, as will be apparent from the above discussion, if step 154 is reached, then the cache control circuitry 25 will have access to the updated version of the data forming the CLP, and accordingly can determine whether it is possible to store that data in one of the compressed states (in this example either the COMP state or the ZERO state). Once the analysis has been performed, it is determined at step 176 what the final size of the data to be stored in the cache will be. It will be appreciated that this could be two cache lines (because the UNC state will be used), one cache line (because the COMP state will be used) or no cache lines (because the ZERO state will be used). If the ZERO state is to be used, the process proceeds to step 178 where the metadata of the associated metadata entry is updated to identify the use of the ZERO state, whereafter at step 180 an invalidation operation is performed to invalidate both of the previous cache lines (whose contents will now be out of date and will not be overwritten because, as discussed earlier, when using the ZERO state the zero data is not actually written into the cache lines). The process then ends at step 192.

If the COMP state is being used, then the odd cache line in the CLP (i.e. the second cache line of the CLP) is invalidated at step 182, whereafter the new metadata and compressed data is written at step 184. Hence, the metadata will be updated to identify the COMP state and the compressed data will be written into the first cache line of the CLP. The process then ends at step 192.

If the UNC state is being used, then it is determined at step 186 whether there are one or two cache lines to be updated. If both cache lines are to be updated, then at step 188 the uncompressed data can be written into the relevant cache lines, and the metadata updated to identify the UNC state. If only one cache line is to be updated, then the new data can be written to the relevant cache line, and the metadata updated as required to identify the UNC state. The process then ends at step 192.

Figure 5:
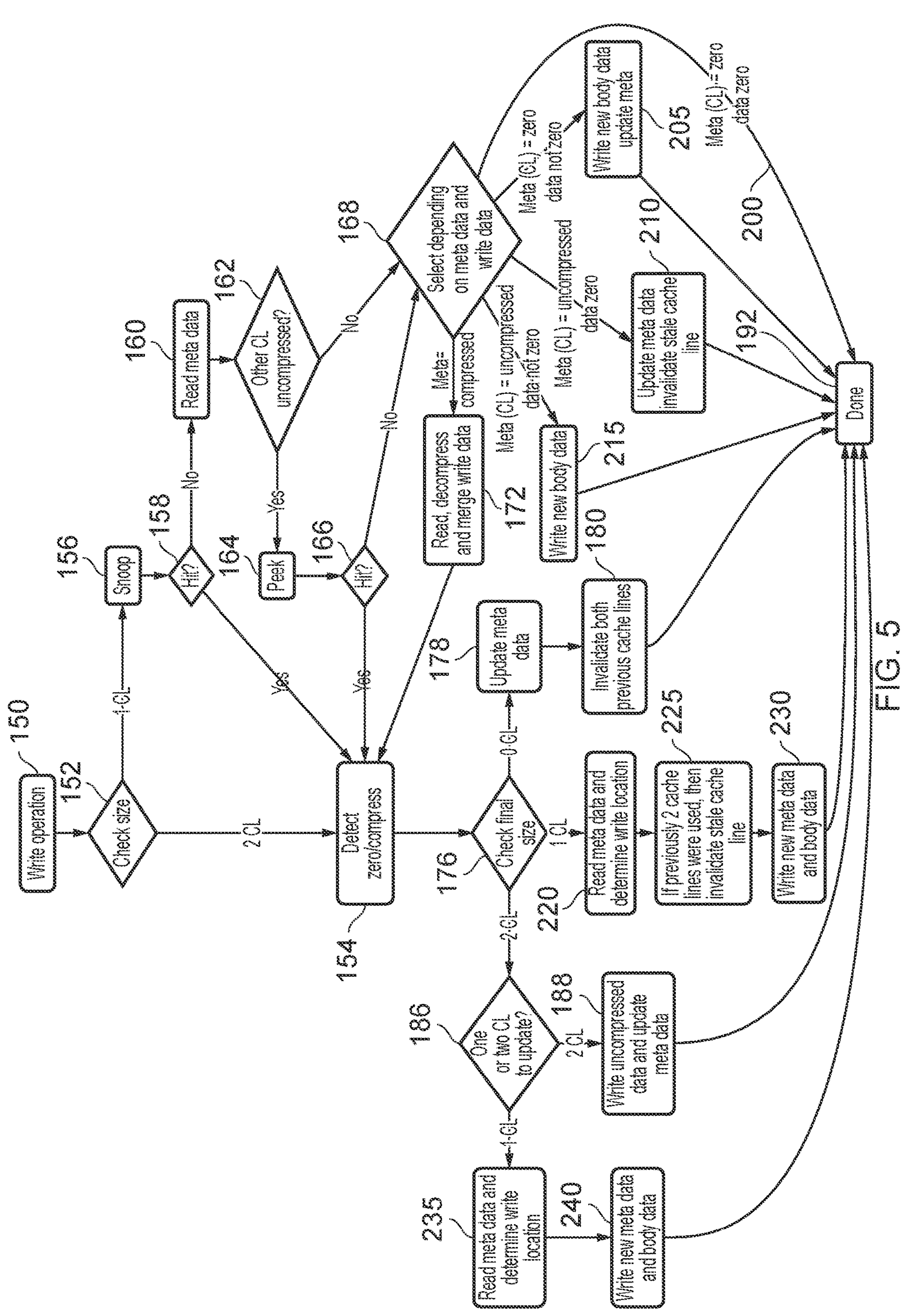
FIG. 5 is a flow diagram illustrating the handling of a write operation, in accordance with an alternative example implementation.

FIG. 5 is a flow diagram illustrating the handling of a write operation by the cache control circuitry 25, in accordance with an alternative example implementation where the use of additional states is supported (in particular the L0Z, L1Z and one or more swapped states are supported in addition to the three states supported in the example of FIG. 4). Those steps that are identical to the steps discussed earlier with reference to FIG. 4 are identified by the same reference numerals in FIG. 5.

As will be apparent from a comparison of FIG. 5 with FIG. 4, if step 168 is reached, then the steps taken thereafter may differ from those described in FIG. 4, due to the increased number of possible states. If the metadata indicates that the previous data for the cache line in question was all zero, and the new data is all zero, then no action is required and the process merely ends at step 192. If the metadata indicates that the previous data for the cache line in question was all zero, but the updated data is non zero, then the process proceeds to step 205 where the new item of data is written, and the metadata is updated to identify the uncompressed state, whereafter the process ends at step 192. Further, if the metadata indicates that the previous data for the cache line in question was uncompressed, and the new data is all zero, then at step 210 the data for the stale cache line is invalidated, and the metadata is updated to identify the appropriate zero detected state (which could be any of the ZERO, L0Z or L1Z states depending on the cache line that is now being set to 0, and the contents of the other cache line of the CLP), whereafter the process ends at step 192.

If the metadata indicates that the previous data for the cache line in question was uncompressed, and the new data being written is non-zero, then at step 215 the new data can be written to the relevant cache line, whereafter the process can end at step 192, since no update to the metadata state is required. As with the example of FIG. 4, if the metadata indicates that the previous contents of the CLP was stored in the COMP state, then at step 172 the previous data can be read and decompressed, whereafter the new write data can be merged with the decompressed data to form an updated version of the CLP for review at step 154.

When considering the steps taken following determination of the final size at step 176, it will be seen that the same steps are taken as in FIG. 4 if no cache lines need to be written. If one cache line needs to be written, then the process proceeds to step 220, where the metadata is read in order to enable the appropriate write location for the new data to be determined. In particular, as will be apparent from the earlier discussion, when swapped states are supported, it may be that the new data is to be written to a cache line other than the default cache line. At step 225, if it was the case that previously two cache lines were used for the CLP, then the stale cache line can be invalidated, and the process can proceed to step 230 where the new item of data can be written to the appropriate cache line, and the metadata state updated as required, whereafter the process ends at step 192.

If at step 186 it is determined that there are two cache lines to update, then the process proceeds to step 188 as discussed earlier with reference to FIG. 4. However, if there is only one cache line to update, then at step 235 the metadata is read in order to determine the appropriate location in which to write the new data (as discussed above, when swapped states are supported it may be that the new data is to be written to a cache line other than the default cache line). Thereafter, at step 240 the new data is written and the metadata is updated as required, prior to the process finishing at step 192.

Figure 6:
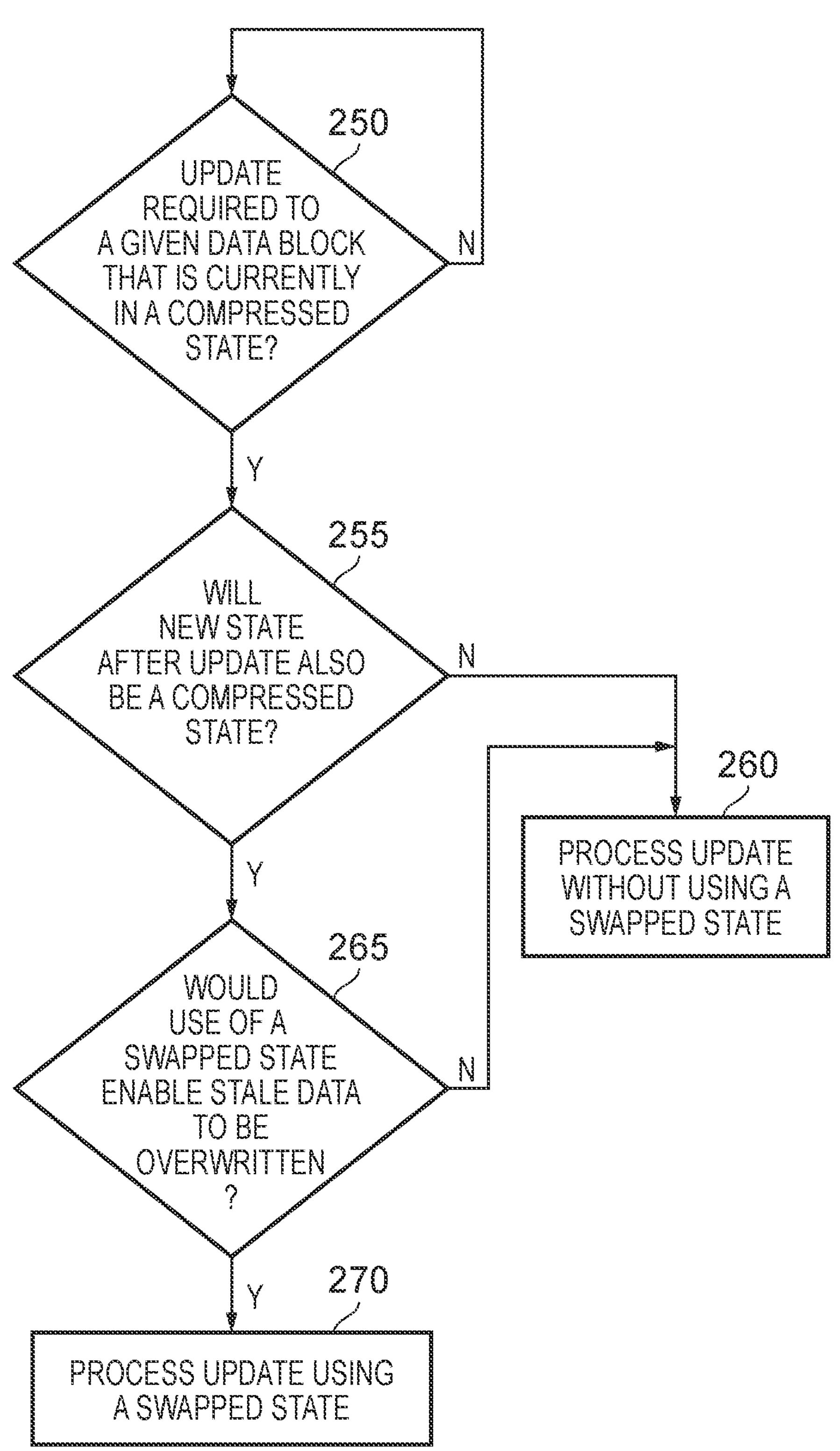
FIG. 6 is a flow diagram illustrating the use of swapped states, in accordance with one example implementation.

FIG. 6 is a flow diagram illustrating steps that may be performed by the cache control circuitry 25 in order to decide whether to use a swapped state. In particular, the process described in FIG. 6 may be used to determine whether to use any of the earlier discussed L0Z_S, L1Z_S or COMP_S states. At step 250, it is determined whether an update is required to a given data block that is currently in a compressed state. If so, then at step 255 it is determined whether the new state after the update will also be a compressed state. If not, then at step 260 the update can be processed without using a swapped state.

If at step 255 it is determined that the new state after update will also be a compressed state, is then determined at step 265 whether the use of a swapped state would enable stale data to be overwritten automatically. If not, the process proceeds to step 260 where the update is processed without using a swapped state, but if use of a swapped state would allow stale data to be overwritten, the process proceeds to step 270 where the update is processed using one of the supported swapped states.

Figure 7:
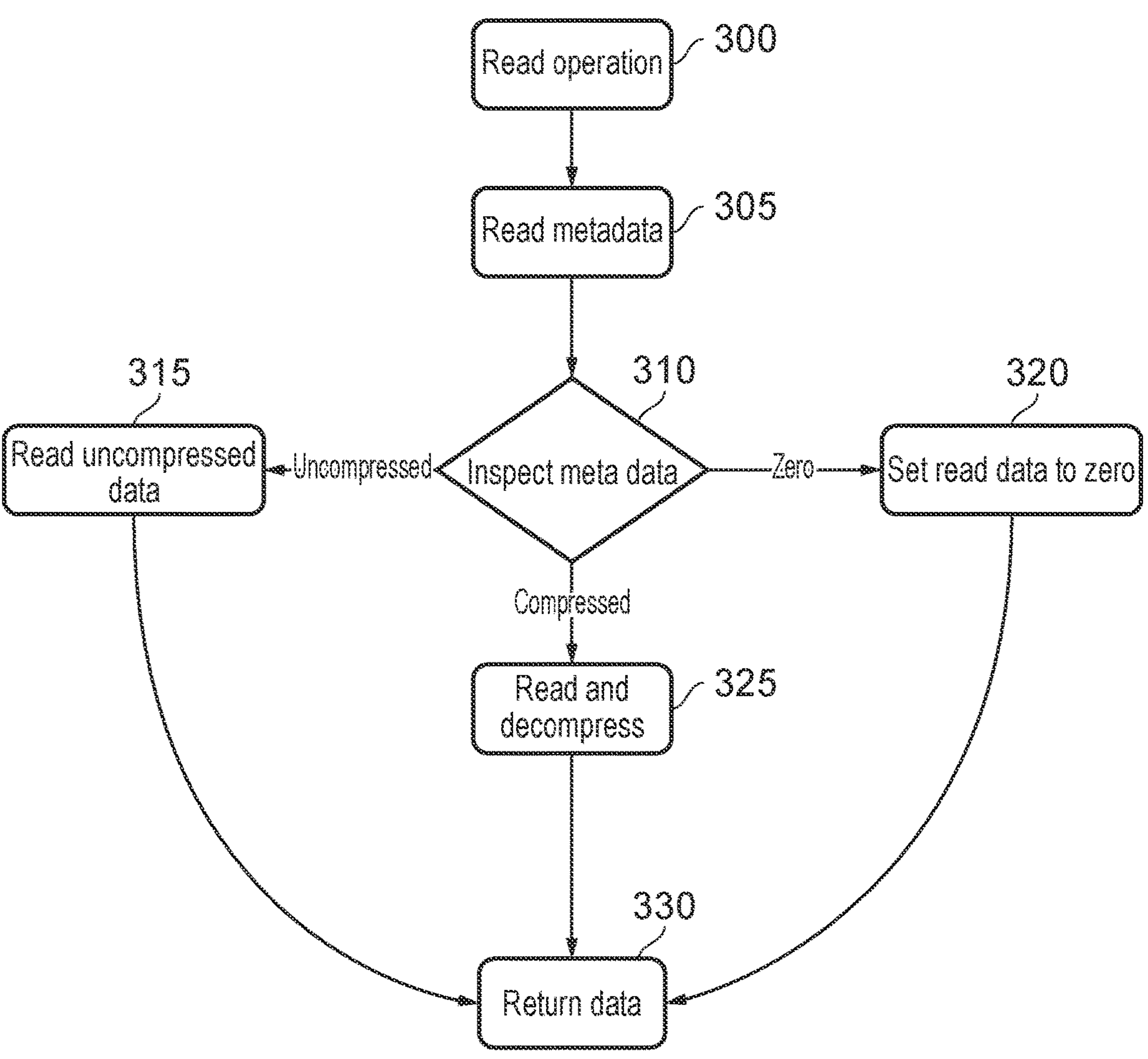
FIG. 7 is a flow diagram illustrating the handling of a read operation, in accordance with one example implementation.

FIG. 7 is a flow diagram illustrating the handling of a read operation (also referred to herein as read transaction), in accordance with one example implementation. On detection of a read operation at step 300, the cache control circuitry 25 is arranged to read the metadata from the metadata entry associated with the CLP to which the read operation is directed. The metadata is then inspected at step 310. If the metadata identifies that the data seeking to be read is stored in uncompressed form, then the process proceeds to step 315 where the uncompressed data is read and then returned to the processing element 10/level 2 cache 15 at step 330. It will be appreciated that this could be the case because the earlier mentioned UNC state is used, but could also be the case if the L0Z or L1Z state (or indeed the L0Z_S or L1Z_S state) is being used and the data seeking to be accessed is the uncompressed data stored in accordance with that format.

If instead it is determined at step 310 that the data seeking to be read is all zero, then the read data is set to zero at step 320 and then returned to the processing element 10/level 2 cache 15 at step 330. No access to the lower level cache 30 is required at this point to service the read operation, since it is known that the data is zero and in any event that zero data is not stored in the relevant cache line. It will be appreciated that step 320 could be performed because the earlier mentioned ZERO state is used, but could also be performed if the L0Z or L1Z state (or indeed the L0Z_S or L1Z_S state) is being used and the data seeking to be accessed is the all zero data identified by that format.

If it is determined that the data is stored in the COMP state, then at step 325 that data is read and decompressed, whereafter the relevant portion of the decompressed data can be returned at step 330 to the processing element 10/level 2 cache 15.

Figure 8:
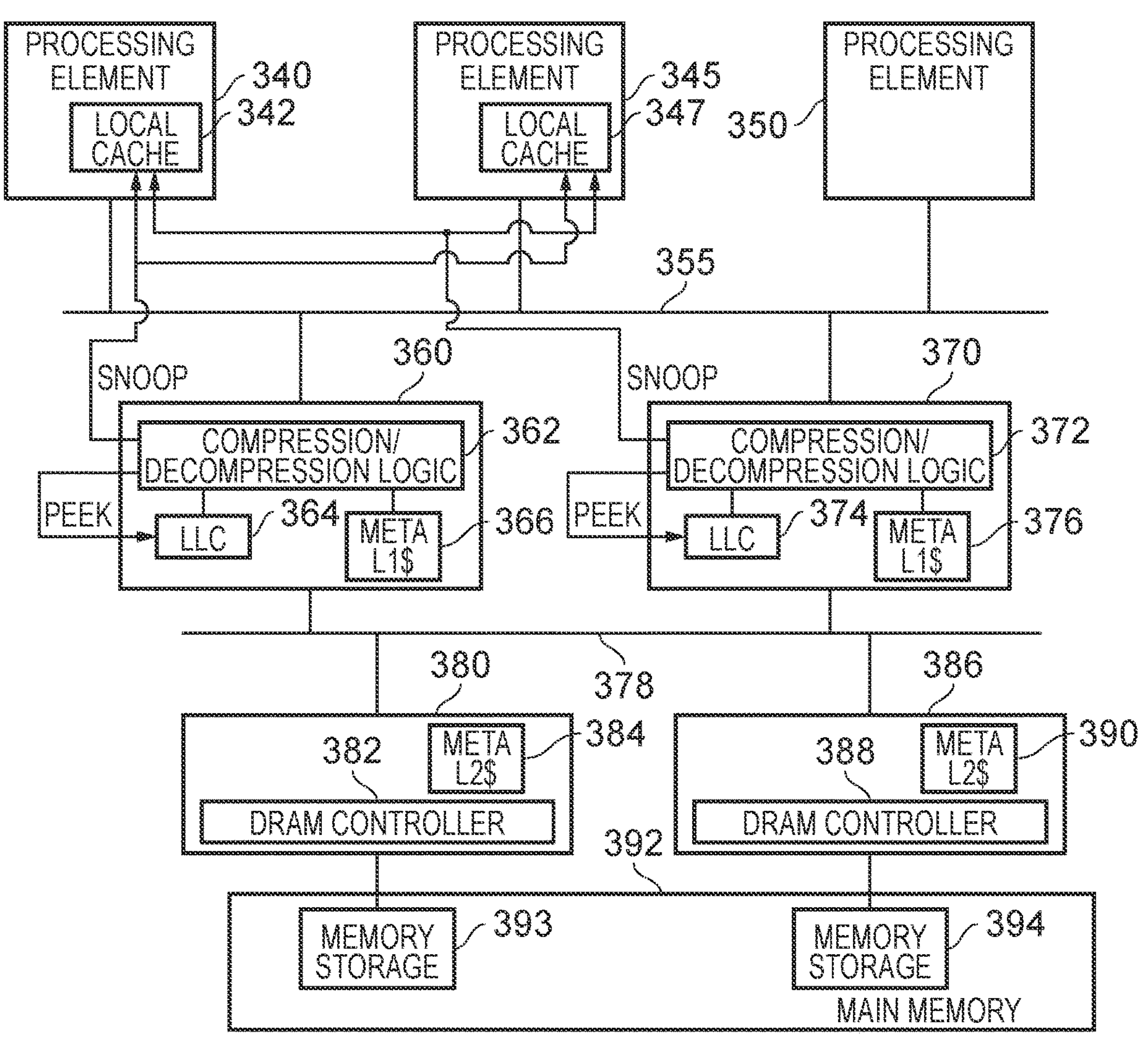
FIG. 8 is a block diagram of a data processing system in accordance with another example implementation.

FIG. 8 provides a block diagram of a data processing system in accordance with another example implementation. In this example, multiple instances of the previously discussed lower level cache 30 and associated cache control circuitry 25 and meta L1 cache 35 are provided to allow data to be interleaved amongst those multiple cache instances in dependence on the memory addresses of the data at a specified interleave granularity. Hence, each of the blocks 360, 370 corresponds to the block 20 shown in FIG. 1, and thus the block 360 contains a lower level cache 364, associated compression/decompression logic 362, and associated meta L1 cache 366. Similarly, the block 370 includes a lower level cache 374, associated compression/decompression logic 372, and associated meta L1 cache 376. In one example implementation, the interleave granularity is the same size as the data block (and hence in one particular example implementation is 128 bytes), but alternatively could be a chosen multiple of the data block size.

Multiple processing elements 340, 345, 350 may share access to the blocks 360, 370 via a bus network 355, and one or more of those processing elements may have local cache structures. In the example shown the processing element 342 has at least one local cache 342 and the processing element 345 has at least one local cache 347. When performing the earlier discussed snoop operations, an instance of the compression/decompression logic 362, 372 may send a snoop request to all local caches that may store a copy of the data being requested, and as discussed earlier snoop filtering mechanisms may be used to determine exactly which local caches are subjected to any particular snoop request.

As also shown in the example of FIG. 8, multiple memory controllers 382, 388 (referred to in FIG. 8 as DRAM controllers as in this example the main memory is implemented as dynamic random access memory) are provided, each being used to access associated memory storage 393, 394 within the main memory 392. As shown by the boxes 380, 386, a meta L2 cache 384, 390 can be associated with each DRAM controller 382, 388, for caching sequences of metadata entries retrieved from main memory.

As discussed earlier, the size of the cache lines in each meta L2 cache 384, 390 can be selected in dependence on the memory transaction size, and in one example each cache line may in a meta L2 cache be 64 bytes. In contrast, the cache lines in each instance of the meta L1 cache 366, 376 can be chosen in dependence on the interleave granularity such that each cache line stores a number of metadata entries required to cover the number of data blocks within a single interleave granularity. In one example implementation, both the data block size and interleave granularity is 128 bytes, and hence each cache line only contains a single metadata entry. The actual number of bits required for the metadata entry will depend on the number of states supported, and as discussed earlier may in example implementations be either 2 bits or 4 bits.

Figure 9:
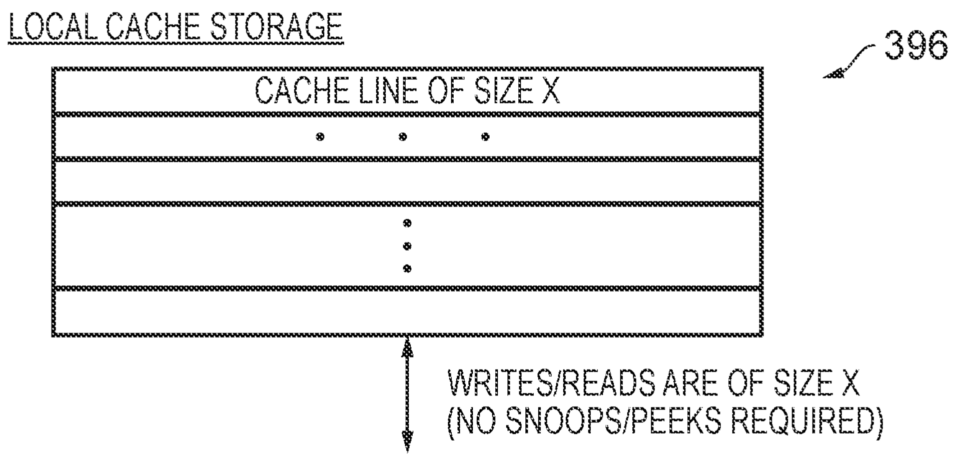
FIG. 9 schematically illustrates how different cache line sizes may be used within a local cache storage and a lower level cache storage, in accordance with one example implementation.
Figure 9:
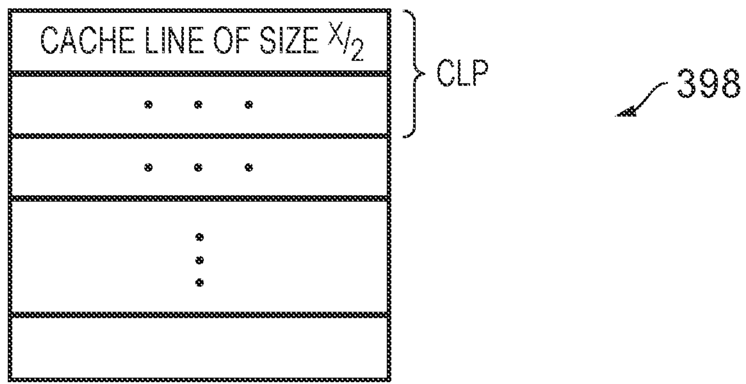

In the examples discussed above, it is assumed that write transactions and read transactions can specify an item of data smaller than the data block size. In particular, in one example implementation the data block may be of size 128 bytes, but a write transaction or a read transaction may specify either 64 bytes or 128 bytes. In such an implementation, it is assumed that the L2 cache 15 will have the same cache line size as the lower level cache 30, i.e. 64 bytes. In such an implementation, as discussed earlier, snoop and/or peek mechanisms can be used to seek to obtain remaining data of a CLP. However, in an alternative implementation as illustrated in FIG. 9, the local cache circuitry may be arranged to provide cache lines that are of the same size as the data block (CLP) size, i.e. 128 bytes in the above example. Hence, as shown in FIG. 9, the local cache storage 396 may provide a plurality of cache lines of size X (i.e. the data block size), whilst in the lower level cache storage 398 the cache lines may be of size X/2 with each data block being a CLP. In such cases, any write or read transactions can be constrained to identify data of size X, and hence there will be no need to support the use of snoop or peek mechanisms to seek to obtain any remaining data of a data block. However, supporting a larger cache line size in the local cache circuitry can result in an increase in the amount of data that is fetched from memory without being used, so the actual cache line size chosen for any local cache circuitry may be varied dependent on implementation.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
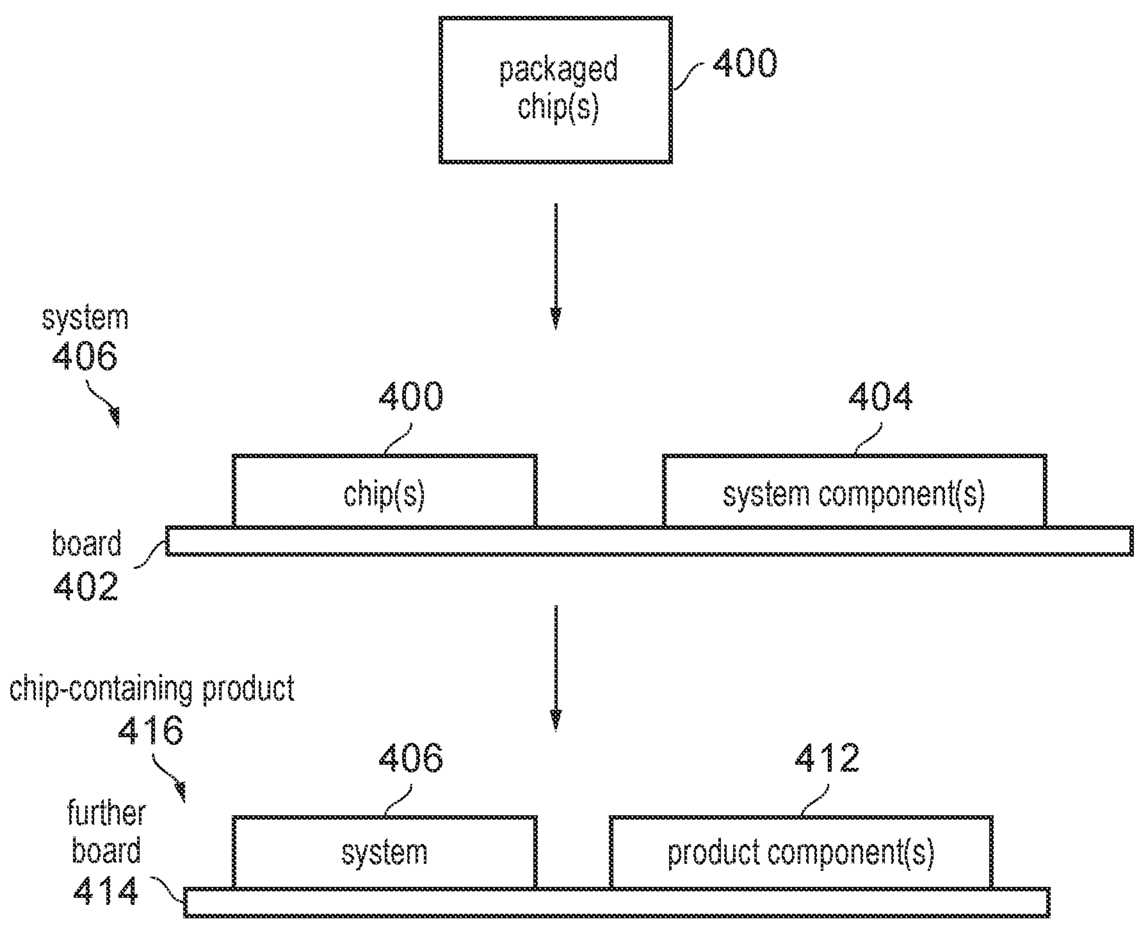
FIG. 10 illustrates a system and a chip-containing product.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Some example configurations are set out in the following numbered clauses:

1. An apparatus comprising:
   cache circuitry providing a plurality of cache lines to store data for access by a processing element; and
   cache control circuitry to control storage of data in the cache circuitry, wherein the cache control circuitry is arranged to manage storage of data within the cache circuitry for data blocks of size X exceeding a size of data that is storeable within a single cache line of the cache circuitry;
   wherein the cache control circuitry is arranged, for each data block to be stored in the cache circuitry, to determine in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry; and
   the cache control circuitry is arranged to maintain a plurality of metadata entries in memory, where each metadata entry is associated with a data block of size X and is arranged to identify in which state that data block is represented when stored in the cache circuitry.
2. An apparatus as in Clause 1, wherein the at least one compressed state comprises a data compression compressed state where the data forming a given data block is subjected to a compression algorithm to generate a compressed form of that data occupying a number of cache lines less than Y.
3. An apparatus as in Clause 1 or Clause 2, wherein the at least one compressed state comprises a zero detected state where the data in a given data block associated with at least one cache line is determined to be all zero, the all zero data is not stored in the cache circuitry and the metadata entry associated with the given data block is arranged to identify the data within the given data block that is all zero.
4. An apparatus as in Clause 3, wherein when using the zero detected state, any non-zero data within the given data block is stored in uncompressed form within a number of cache lines less than Y, and the metadata entry associated with the given data block is arranged to identify each cache line that stores the non-zero data.
5. An apparatus as in any preceding clause, wherein:
   the cache control circuitry is responsive to a write transaction issued by the processing element providing a memory address indication for an item of data to be written into the cache circuitry, to determine with reference to the memory address indication an associated data block, to determine an updated version of the associated data block produced by writing the item of data to the associated data block, to store the updated version of the associated data block in a given state chosen in dependence on the data forming the updated version of the associated data block, and to update the metadata entry provided for the associated data block as required to identify the given state.
6. An apparatus as in Clause 5, wherein:
   the processing element has local cache circuitry;
   when the item of data specified by the write transaction is less than size X, the cache control circuitry is arranged to issue a snoop request to seek to obtain remaining data of the associated data block from the local cache circuitry if available, so as to enable the updated version of the associated data block to be produced.
7. An apparatus as in Clause 5 or Clause 6, wherein when the item of data specified by the write transaction is less than size X, the cache control circuitry is arranged, at least in the presence of a qualifying condition, to perform a lookup in the cache circuitry to seek to obtain remaining data of the associated data block from the cache circuitry if available, so as to enable the updated version of the associated data block to be produced.
8. An apparatus as in Clause 7, wherein the cache control circuitry is arranged to access the metadata entry for the associated data block, and to determine that the qualifying condition is present when the metadata entry identifies the associated data block as being in the uncompressed state.
9. An apparatus as in Clause 7 or Clause 8 when dependent on Clause 6, wherein when the remaining data of the associated data block is not available from either the local cache circuitry or the cache circuitry, the cache control circuitry is arranged to determine how to process the write transaction in dependence on the state of the associated data block as indicated by the metadata entry for the associated data block.
10. An apparatus as in any of clauses 5 to 9, wherein the plurality of states includes one or more swapped states in which a given portion of data of a size of a cache line is stored in a cache line other than a default cache line for that given portion of data, and the cache control circuitry is arranged to use a chosen swapped state from amongst the one or more swapped states when the associated data block was in a compressed state before the write transaction was processed, the updated version of the associated data block is to be stored in a compressed state, and the use of the chosen swapped state will cause stale data to be overwritten.

11. An apparatus as in any preceding clause, wherein:
when the cache control circuitry causes the state associated with a given data block stored in the cache circuitry to be changed, the cache control circuitry is arranged to cause invalidation of any cache lines in the cache storage that will store stale data as a result of the change of state.

12. An apparatus as in any preceding clause, wherein:
the cache control circuitry is responsive to a read transaction issued by the processing element providing a memory address indication for an item of data to be read from the cache circuitry, to determine with reference to the memory address indication an associated data block, to access the metadata entry for that associated data block to determine the state in which the associated data block is stored, and to process the read request in dependence on the determined state for the associated data block.

13. An apparatus as in any preceding clause, comprising at least one metadata cache in which to cache metadata entries, each metadata cache providing cache lines in which to store a number of metadata entries, and a size of the cache lines in a given metadata cache being dependent on a location of the metadata cache within the apparatus.

14. An apparatus as in Clause 13, wherein the at least one metadata cache is a memory controller level metadata cache associated with a memory controller used to issue memory transactions to memory of a given memory transaction size, wherein the size of the cache lines in the memory controller level metadata cache is set in dependence on the given memory transaction size.

15. An apparatus as in Clause 13 or Clause 14, wherein:
the cache circuitry is arranged to be provided as one of a plurality of caches at a given level of a memory hierarchy, and data is interleaved amongst the plurality of caches in dependence on an associated memory address of the data at an interleave granularity of N*X, where N is an integer of one or more; and
the at least one metadata cache comprises a cache circuitry level metadata cache that is accessible to the cache control circuitry, wherein the size of the cache lines in the cache circuitry level metadata cache is set in dependence on the interleave granularity.

16. An apparatus as in any preceding clause, wherein the plurality of states are chosen so as to remove a need for a read-modify-write operation in at least one scenario when a data block stored in the cache circuitry is updated.

17. An apparatus as in any preceding clause, wherein the processing element has local cache circuitry providing a plurality of cache lines of size X.

18. A method of storing data in cache circuitry, comprising:
providing the cache circuitry with a plurality of cache lines to store data for access by a processing element; and
employing cache control circuitry to control storage of data within the cache circuitry for data blocks of size X exceeding a size of data that is storeable within a single cache line of the cache circuitry by:
for each data block to be stored in the cache circuitry, determining in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry; and
maintaining a plurality of metadata entries in memory, where each metadata entry is associated with a data block of size X and is arranged to identify in which state that data block is represented when stored in the cache circuitry.

19. A system comprising:
the apparatus of any of clauses 1 to 17, implemented in at least one packaged chip;
at least one system component; and
a board,
wherein the at least one packaged chip and the at least one system component are assembled on the board.

20. A chip-containing product comprising the system of clause 19 assembled on a further board with at least one other product component.

21. A computer-readable medium to store computer-readable code for fabrication of the apparatus of any of clauses 1 to 17.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination 5 (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
cache circuitry providing a plurality of cache lines to store data for access by a processing element; and
cache control circuitry arranged to control storage of data with associated memory addresses in main memory in the cache circuitry, wherein the cache control circuitry is arranged to manage storage of data within the cache circuitry for data blocks of size X exceeding a size of data that is storeable within a single cache line of the cache circuitry;

wherein the cache control circuitry is arranged, for each data block to be stored in the cache circuitry, to determine in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry, wherein the cache control circuitry is arranged to determine in which state of the plurality of states to store that data block in the cache circuitry based on evaluating a current state of data of that data block to determine whether there is any available state that would allow that data block to be stored in a compressed state within the cache occupying fewer cache lines than the current state; and the cache control circuitry is arranged to maintain a plurality of metadata entries in the main memory, where each metadata entry is associated with a data block of size X and is arranged to identify which state has been chosen by the cache control circuitry to represent that data block when stored in the cache circuitry.

2. An apparatus as claimed in claim 1, wherein the at least one compressed state comprises a data compression compressed state where the data forming a given data block is subjected to a compression algorithm to generate a compressed form of that data occupying a number of cache lines less than Y.

3. An apparatus as claimed in claim 1, wherein the at least one compressed state comprises a zero detected state where the data in a given data block associated with at least one cache line is determined to be all zero, the all zero data is not stored in the cache circuitry and the metadata entry associated with the given data block is arranged to identify the data within the given data block that is all zero.

4. An apparatus as claimed in claim 3, wherein when using the zero detected state, any non-zero data within the given data block is stored in uncompressed form within a number of cache lines less than Y, and the metadata entry associated with the given data block is arranged to identify each cache line that stores the non-zero data.

5. An apparatus as claimed in claim 1, wherein:

the cache control circuitry is responsive to a write transaction issued by the processing element providing a memory address indication for an item of data to be written into the cache circuitry, to determine with reference to the memory address indication an associated data block, to determine an updated version of the associated data block produced by writing the item of data to the associated data block, to store the updated version of the associated data block in a given state chosen in dependence on the data forming the updated version of the associated data block, and to update the metadata entry provided for the associated data block as required to identify the given state.

6. An apparatus as claimed in claim 5, wherein:

the processing element has local cache circuitry;

when the item of data specified by the write transaction is less than size X, the cache control circuitry is arranged to issue a snoop request to seek to obtain remaining data of the associated data block from the local cache circuitry if available, so as to enable the updated version of the associated data block to be produced.

7. An apparatus as claimed in claim 5, wherein when the item of data specified by the write transaction is less than size X, the cache control circuitry is arranged, at least in the presence of a qualifying condition, to perform a lookup in the cache circuitry to seek to obtain remaining data of the associated data block from the cache circuitry if available, so as to enable the updated version of the associated data block to be produced.

8. An apparatus as claimed in claim 7, wherein the cache control circuitry is arranged to access the metadata entry for the associated data block, and to determine that the qualifying condition is present when the metadata entry identifies the associated data block as being in the uncompressed state.

9. An apparatus as claimed in claim 5, wherein:

the processing element has local cache circuitry;

when the item of data specified by the write transaction is less than size X, the cache control circuitry is arranged to issue a snoop request to seek to obtain remaining data of the associated data block from the local cache circuitry if available, so as to enable the updated version of the associated data block to be produced, and when the item of data specified by the write transaction is less than size X, the cache control circuitry is arranged, at least in the presence of a qualifying condition, to perform a lookup in the cache circuitry to seek to obtain the remaining data of the associated data block from the cache circuitry if available, so as to enable the updated version of the associated data block to be produced; and when the remaining data of the associated data block is not available from either the local cache circuitry or the cache circuitry, the cache control circuitry is arranged to determine how to process the write transaction in dependence on the state of the associated data block as indicated by the metadata entry for the associated data block.

10. An apparatus as claimed in claim 5, wherein the plurality of states includes one or more swapped states in which a given portion of data of a size of a cache line is stored in a cache line other than a default cache line for that given portion of data, and the cache control circuitry is arranged to use a chosen swapped state from amongst the one or more swapped states when the associated data block was in a compressed state before the write transaction was processed, the updated version of the associated data block is to be stored in a compressed state, and the use of the chosen swapped state will cause stale data to be overwritten.

11. An apparatus as claimed in claim 1, wherein:

when the cache control circuitry causes the state associated with a given data block stored in the cache circuitry to be changed, the cache control circuitry is arranged to cause invalidation of any cache lines in the cache storage that will store stale data as a result of the change of state.

12. An apparatus as claimed in claim 1, wherein:

the cache control circuitry is responsive to a read transaction issued by the processing element providing a memory address indication for an item of data to be read from the cache circuitry, to determine with reference to the memory address indication an associated data block, to access the metadata entry for that associated data block to determine the state in which the associated data block is stored, and to process the read request in dependence on the determined state for the associated data block.

13. An apparatus as claimed in claim 1, comprising at least one metadata cache in which to cache metadata entries, each metadata cache providing cache lines in which to store a number of metadata entries, and a size of the cache lines in a given metadata cache being dependent on a location of the metadata cache within the apparatus.

14. An apparatus as claimed in claim 13, wherein the at least one metadata cache is a memory controller level metadata cache associated with a memory controller used to issue memory transactions to memory of a given memory transaction size, wherein the size of the cache lines in the memory controller level metadata cache is set in dependence on the given memory transaction size.

15. An apparatus as claimed in claim 13, wherein:

the cache circuitry is arranged to be provided as one of a plurality of caches at a given level of a memory hierarchy, and data is interleaved amongst the plurality of caches in dependence on an associated memory address of the data at an interleave granularity of N*X, where N is an integer of one or more; and the at least one metadata cache comprises a cache circuitry level metadata cache that is accessible to the cache control circuitry, wherein the size of the cache lines in the cache circuitry level metadata cache is set in dependence on the interleave granularity.

16. An apparatus as claimed in claim 1, wherein the plurality of states are chosen so as to remove a need for a read-modify-write operation in at least one scenario when a data block stored in the cache circuitry is updated.

17. The apparatus as claimed in claim 1, wherein:

the cache control circuitry is arranged to determine in which state of the plurality of states to store that data block in the cache circuitry based on evaluating a current state of data in two cache lines of that data block to determine whether there is any available state that would allow said data to be stored in a compressed state within the cache occupying fewer than two cache lines.

18. A method of storing data in cache circuitry, comprising:

providing the cache circuitry with a plurality of cache lines to store data for access by a processing element; and employing cache control circuitry to control storage of data with associated memory addresses in main memory within the cache circuitry for data blocks of size X exceeding a size of data that is storeable within a single cache line of the cache circuitry by:

for each data block to be stored in the cache circuitry, determining in which state of a plurality of states to store that data block in the cache circuitry, the plurality of states comprising an uncompressed state where the data block is stored within a plurality Y of cache lines and at least one compressed state where the data block is represented in a form occupying less than Y cache lines within the cache circuitry, wherein the determination is based on evaluating a current state of data of that data block to determine whether there is any available state that would allow that data block to be stored in a compressed state within the cache occupying fewer cache lines than the current state; and maintaining a plurality of metadata entries in the main memory, where each metadata entry is associated with a data block of size X and is arranged to identify which state has been chosen by the cache control circuitry to represent that data block when stored in the cache circuitry.

19. A system comprising:

the apparatus of claim 1, implemented in at least one packaged chip;

at least one system component; and a board, wherein the at least one packaged chip and the at least one system component are assembled on the board.

20. A chip-containing product comprising the system of claim 19 assembled on a further board with at least one other product component.

* * * * *